WELL TOOLS

Original Filed July 2, 1965 8 Sheets-Sheet 1

INVENTOR
DONALD F. TAYLOR JR.

BY Geo. Hastings Ackley
ATTORNEYS

WELL TOOLS

Original Filed July 2, 1965 8 Sheets-Sheet 2

INVENTOR
DONALD F. TAYLOR JR.

BY Ostrander & Ashley
ATTORNEYS

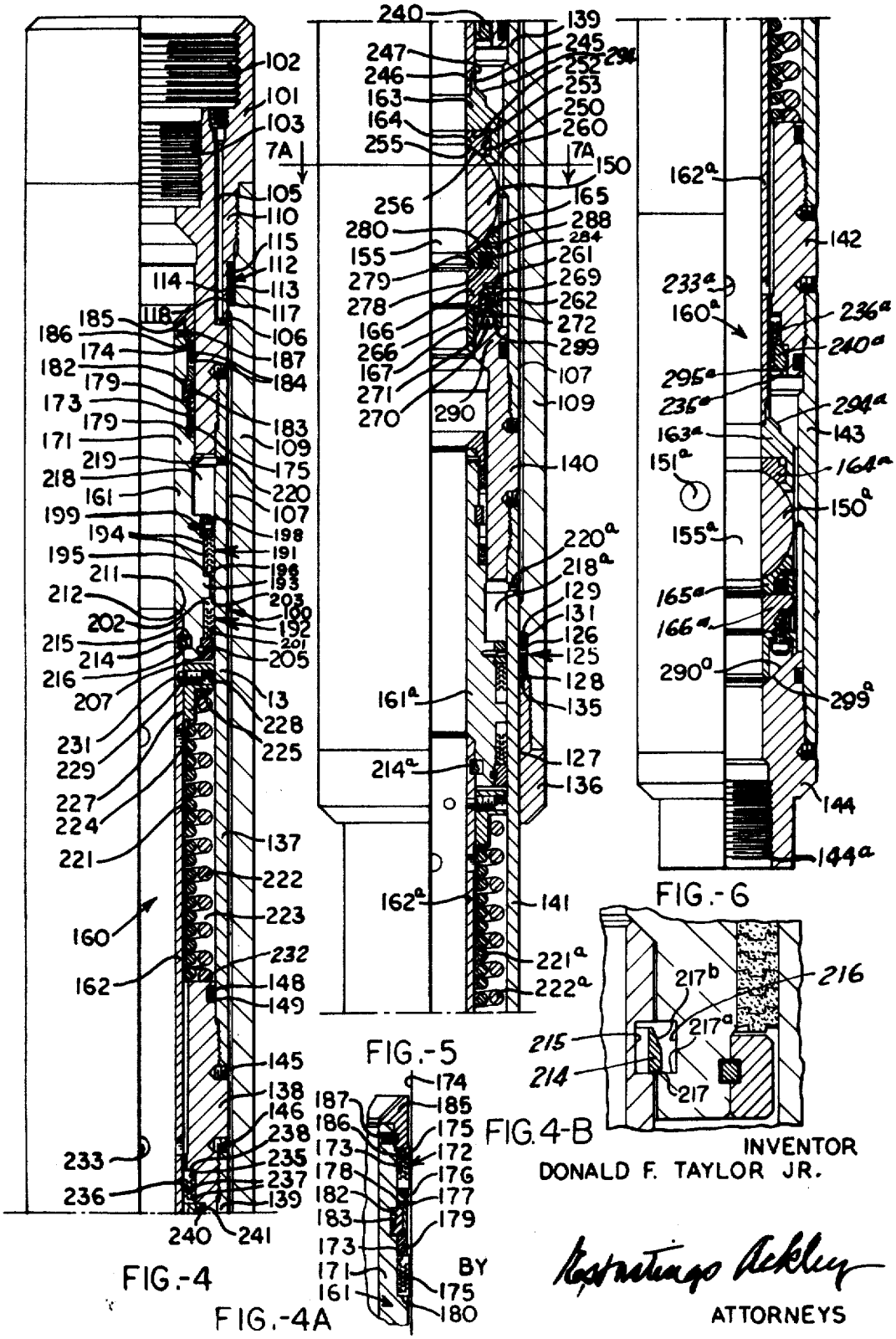
INVENTOR
DONALD F. TAYLOR JR.
BY
ATTORNEYS

WELL TOOLS

Original Filed July 2, 1965 8 Sheets-Sheet 4

INVENTOR
DONALD F. TAYLOR JR.

BY Kastrup & Ashley
ATTORNEYS

INVENTOR
DONALD F. TAYLOR JR.

BY Fostertings Ashley
ATTORNEYS

INVENTOR
DONALD F. TAYLOR JR.

BY Rostringer Ashley
ATTORNEYS

FIG. 14-A

INVENTOR
DONALD F. TAYLOR JR.

BY Hastings Ashley
ATTORNEYS

INVENTOR
DONALD F. TAYLOR JR.

BY Rothwell Cushman Clark
ATTORNEYS

United States Patent Office

Re. 27,464
Reissued Aug. 22, 1972

27,464
WELL TOOLS

Donald F. Taylor, Jr., Dallas, Tex., assignor to
Otis Engineering Corporation, Dallas, Tex.

Original No. 3,411,576, dated Nov. 19, 1968, Ser. No. 469,978, July 2, 1965. Application for reissue Nov. 10, 1969, Ser. No. 871,492
Int. Cl. E21b *33/35*
U.S. Cl. 166—.5 44 Claims

Matter enclosed in heavy brackets [ ] appears in the original patent but forms no part of this reissue specification; matter printed in italics indicates the additions made by reissue.

ABSTRACT OF THE DISCLOSURE

An apparatus and method for controlling flow in a well after the same has been drilled, particularly adaptable for submarine wells.

The invention is directed toward well flow conductor installation utilizing equipment, such as blow-out preventers, installed on the well during the drilling thereof to support a flow conductor and flow control valve for controlling flow and performing operations on the well after the same has been drilled, together with an improved flow conductor support, connector and flow control valve, which are designed to provide means to quickly close in the well to prevent undesired flow from the well, and to provide automatic blow-out prevention.

This invention relates to well tools and more particularly to a flow conductor assembly for use in a well installation employed during the drilling of a well and to well tools usable in such flow conductor assembly.

An object of this invention is to provide a new and improved flow conductor assembly, which is installable in the well installation employed during the drilling of a well, through which various operations may be performed, such as perforating, short time production testing, and the like.

Still another object is to provide a flow conductor assembly which is held in place in the well installation by a blowout preventer of the well installation which was used in the drilling of the well.

Still another object is to provide a flow conductor assembly having a flow conductor through which fluids may flow between the surface and the well which is provided with a valve located below the blowout preventer and which may be controlled from the surface.

A further object is to provide a flow conductor assembly in which the valve is biased toward its closed position and which is movable to open position by means controllable from the surface.

A still further object is to provide a flow conductor assembly having a flow passage through which a control fluid is conducted to the valve from the surface wherein the valve is moved to open position by increasing the pressure of the control fluid at the surface.

Still further object is to provide a flow conductor assembly which permits movement of well tools therethrough into and from the well.

Another object is to provide a well flow conductor assembly usable in a well installation employed in the drilling of a well below a body of water wherein the well installation provides a continuous passage from above the surface of the water into the well and wherein the valve of the flow conductor assembly is positioned near the ocean floor when the well installation is positioned in the well and being held by a blowout preventer which closes the continuous passage about the well flow conductor assembly.

Still another object is to provide a flow conductor assembly including a valve connectable to the top of a tubing which extends into the well and a pair of telescoped concentric flow conductors connected to the upper end of the valve, the inner flow conductor conducting fluid being in alignment and communication with the tubing when the valve is open and the telescoped conductors providing a passage therebetween through which control fluid from the surface is transmitted to the valve to open the valve.

Still another object is to provide a flow conductor installation wherein the outer flow conductor is provided with a means engageable by the blowout preventer of a well installation for holding the flow conductor assembly against movement in the well installation.

A further object is to provide a flow conductor assembly wherein a connector head is connected to the upper ends of the telescoped flow conductors and has passages communicating with the inner flow conductor and the control fluid passage wherein the connector head has means for detachably securing a large flow conductor thereto for communication with the inner flow conductor and a small control fluid flow conductor for communication with the passage provided by the telescoped conductors.

A still further object is to provide a latch mandrel for a flow conductor releasably engageable with a latch means of the flow conductor when it is inserted downwardly and placed in communication with the inner concentric flow conductor thereinto and which is not releasable thereon except upon rotation of the latch mandrel.

A still further object is to provide a latch mandrel and valve assembly for the use with a second flow conductor which is engageable with a latch means of the connector head wherein it is inserted into another passage of the connector head and placed into communication with the control fluid flow passage of the concentric conductors and which is releasable therefrom only upon rotation thereof.

Another object is to provide a new and improved guide usable with the latch mandrel for orienting the latch mandrel and the latch mandrel and valve assembly with the two passages of the connector head.

Still another object is to provide a flow conductor assembly having means for a new and improved connector head usable in the flow conductor assembly which is provided with latch means engageable with latch mandrel to releasably secure the flow conductors inserted therein against nonrotational displacement therefrom.

An important object of the invention is to provide a valve having a housing in which a pair of balls provided with axial passages are mounted, each of which is separately biased toward its closed position and has an operator means for moving it to open position, the housing having means for simultaneously conducting control fluid under pressure to the two operator means to cause the balls to be moved to their open positions.

Still another object is to provide a valve wherein each operator means includes a piston and a piston member releasably secured to the piston, the piston member being biased upwardly to hold the ball in closed position, the ball being moved to open position when the pressure thereabove exceeds the pressure therebelow by a predetermined value sufficiently great to release the piston member from the piston and overcome the force biasing the piston member upwardly.

[Still another object is to provide a valve having a housing, a ball valve mounted in the housing and having an axial passage, wherein the ball and the mandrel having coengageable means rotating the ball through substantially 90 degrees upon predetermined assembly for the ball including a tubular piston, a tubular piston member detachably secured to the piston and having seat means at its lower end engaging the ball, in one direction to hold the ball in closed position, and means operatively associated with the piston member for moving the ball longitudinally in the housing therewith, whereby the ball closes the lower end of the tubular piston member when the ball is in its open position.]

Still another object is to provide a valve wherein the housing is provided with a flow passage through which control fluid under pressure is transmitted to the piston to move the piston member and therefore the ball to its open position against the force exerted thereon by the means biasing the piston member.

A further object is to provide a new and improved guide for orienting successively a large flow conductor and a small flow conductor in alignment with the upper ends of the passages of a connector head.

Additional objects and advantages of the invention will be readily apparent from the reading of the following description of a device constructed in accordance with the invention, and reference to the accompanying drawings thereof, wherein:

FIGURE 4 is a vertical, partly sectional view of the upper portion of the valve of the flow conductor assembly;

Figure 13:
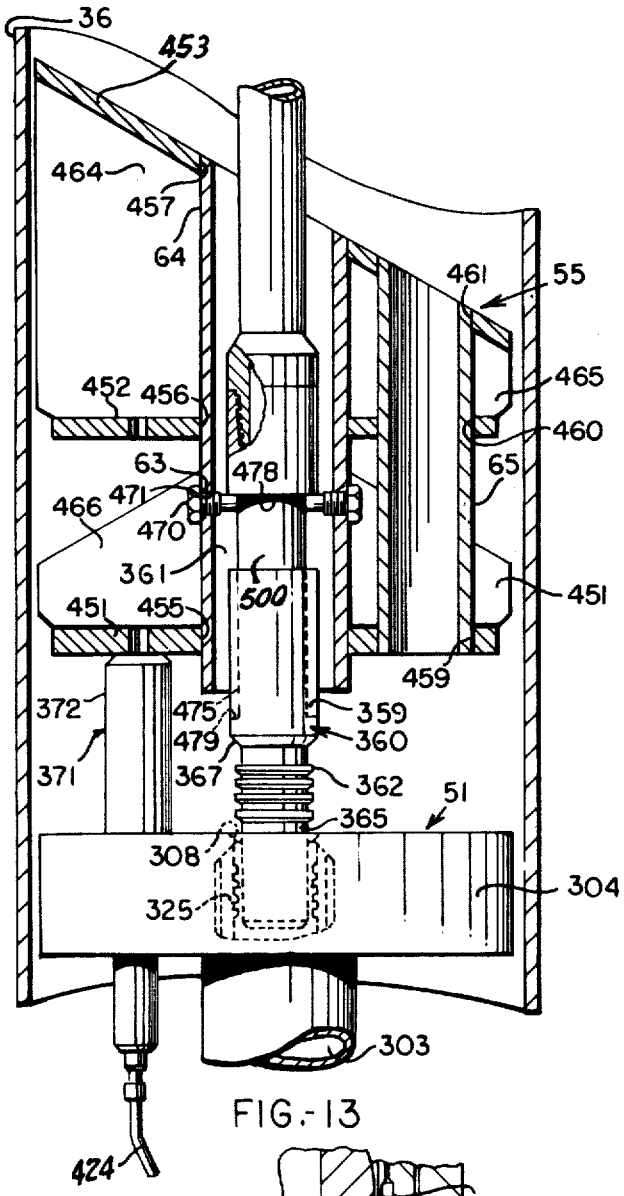
Figure 12:
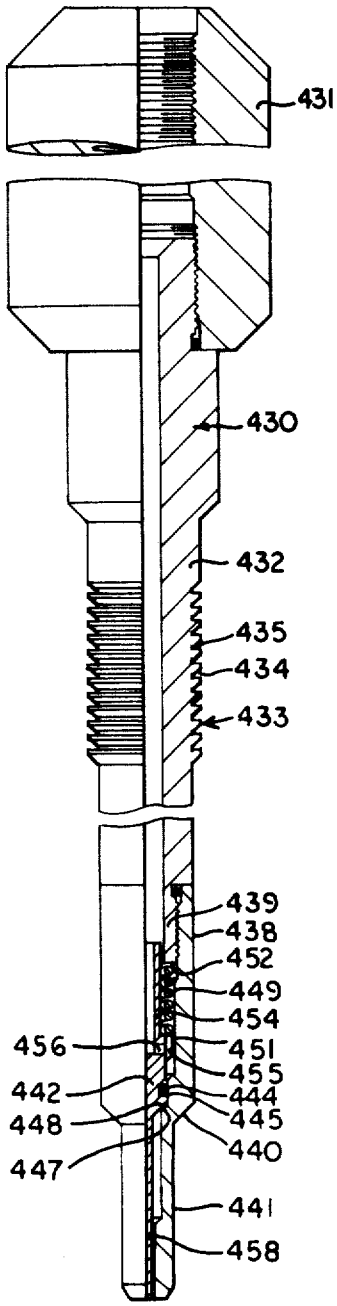
Figure 7:
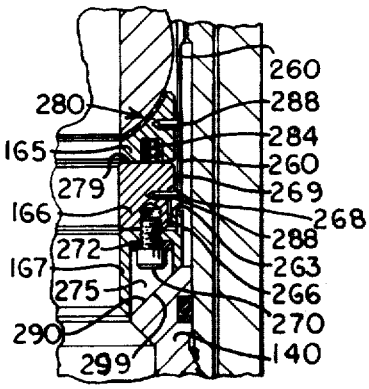
Figure 8:
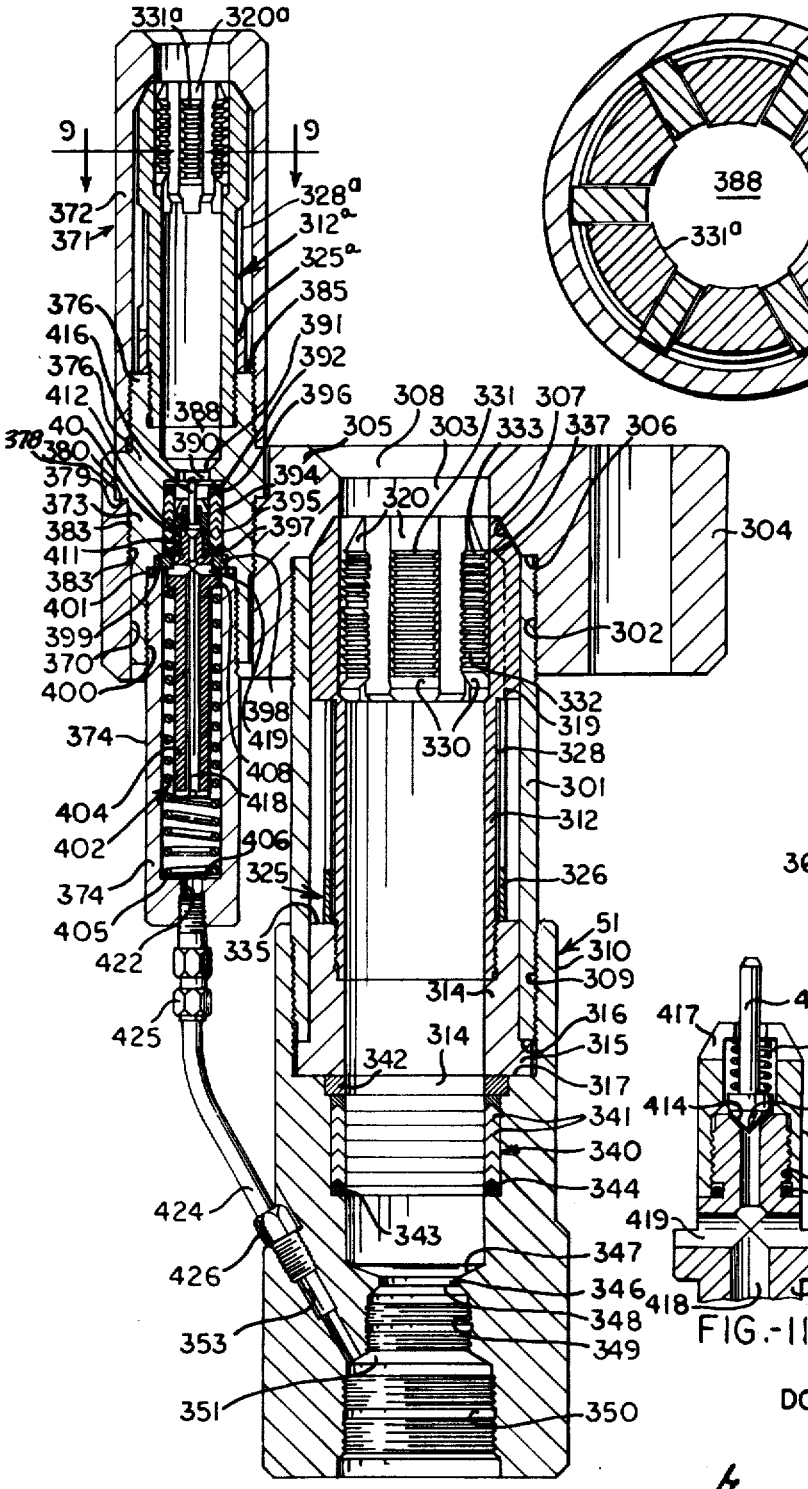
Figure 9:
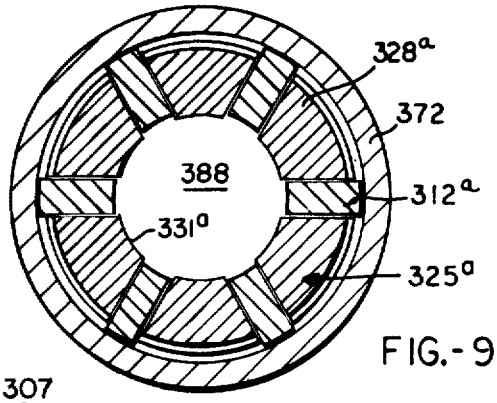
Figure 10:
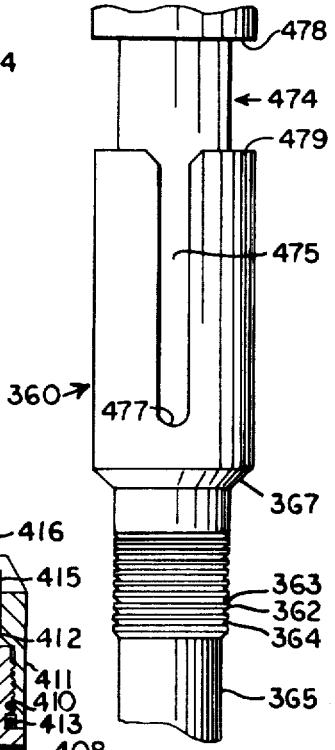
Figure 11:
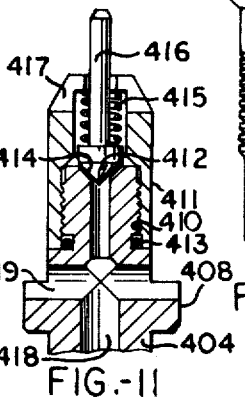
Figure 14:
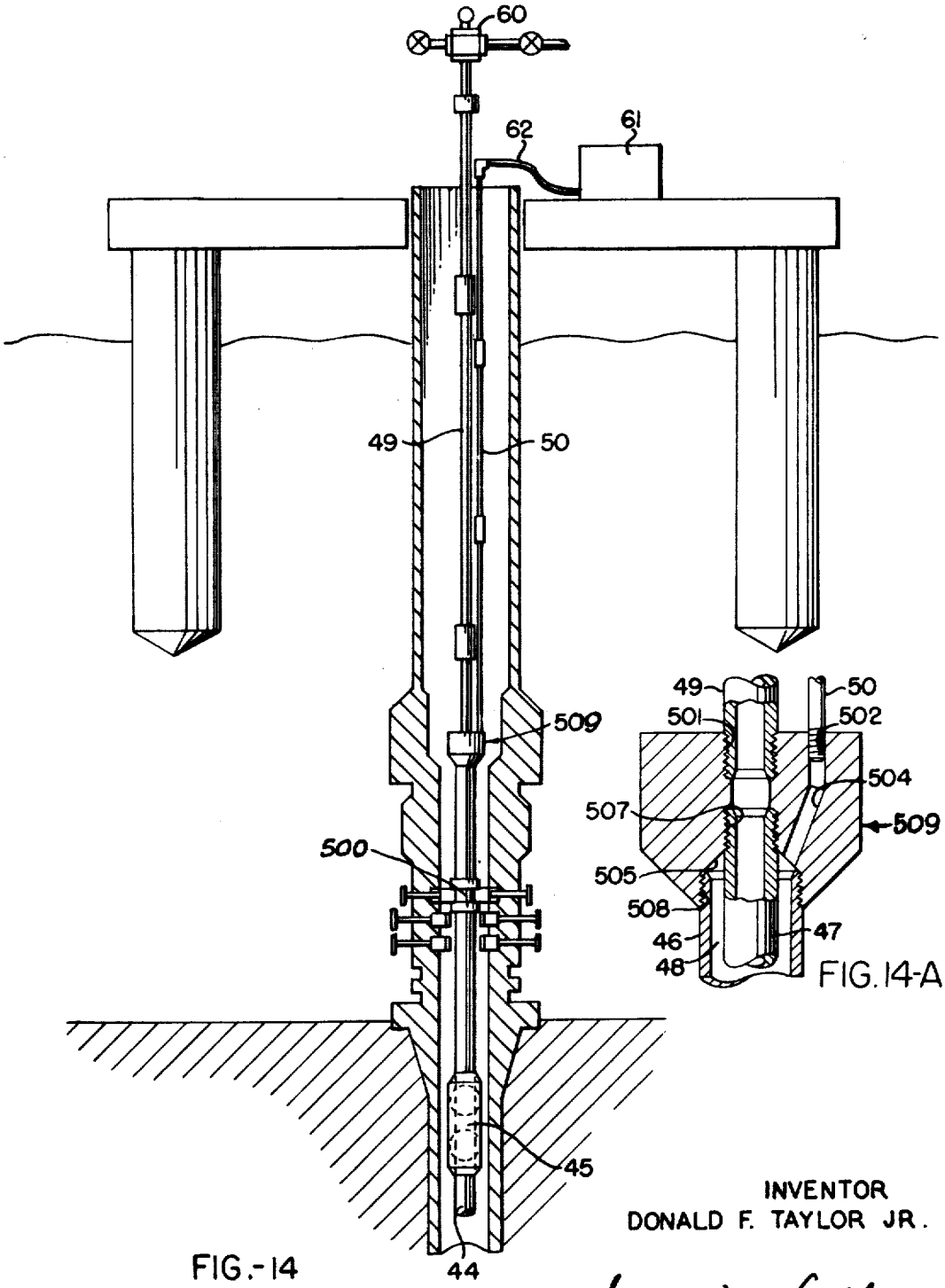

FIGURE 4-A is a fragmentary enlarged view of a portion of the valve;

FIGURE 4-B is an enlarged fragmentary view of a portion of the valve;

FIGURE 5 is a view similar to FIGURE 4, being a continuation thereof showing an intermediate portion of the valve;

FIGURE 6 is a view similar to FIGURE 5, being a continuation thereof, showing the bottom portion of the valve;

FIGURE 7 is an enlarged fragmentary sectional view of a portion of the valve;

FIGURE 7-A is a sectional view taken on line [7—7] *7-A—7-A* of FIGURE 5;

FIGURE 8 is a vertical sectional view of the connector head of the flow conductor assembly;

FIGURE 9 is an enlarged sectional view taken on line 9—9 of FIGURE 8;

FIGURE 10 is a fragmentary side view of a latch mandrel connectable in one passage of the flow conductor assembly;

FIGURE 11 is an enlarged fragmentary, vertical, sectional view of the valve of the connector head;

FIGURE 12 is a vertical, partly sectional view of a latch mandrel and valve assembly which is connectable in another passage of the connector head;

FIGURE 13 is a vertical, partly sectional, view of the guide and the connector head of the flow conductor assembly showing the guide mounted on the latch mandrel of a large flow conductor;

FIGURE 14 is a schematic, partly sectional view showing a modified form of the flow conductor assembly in the well installation.

Figure 15:
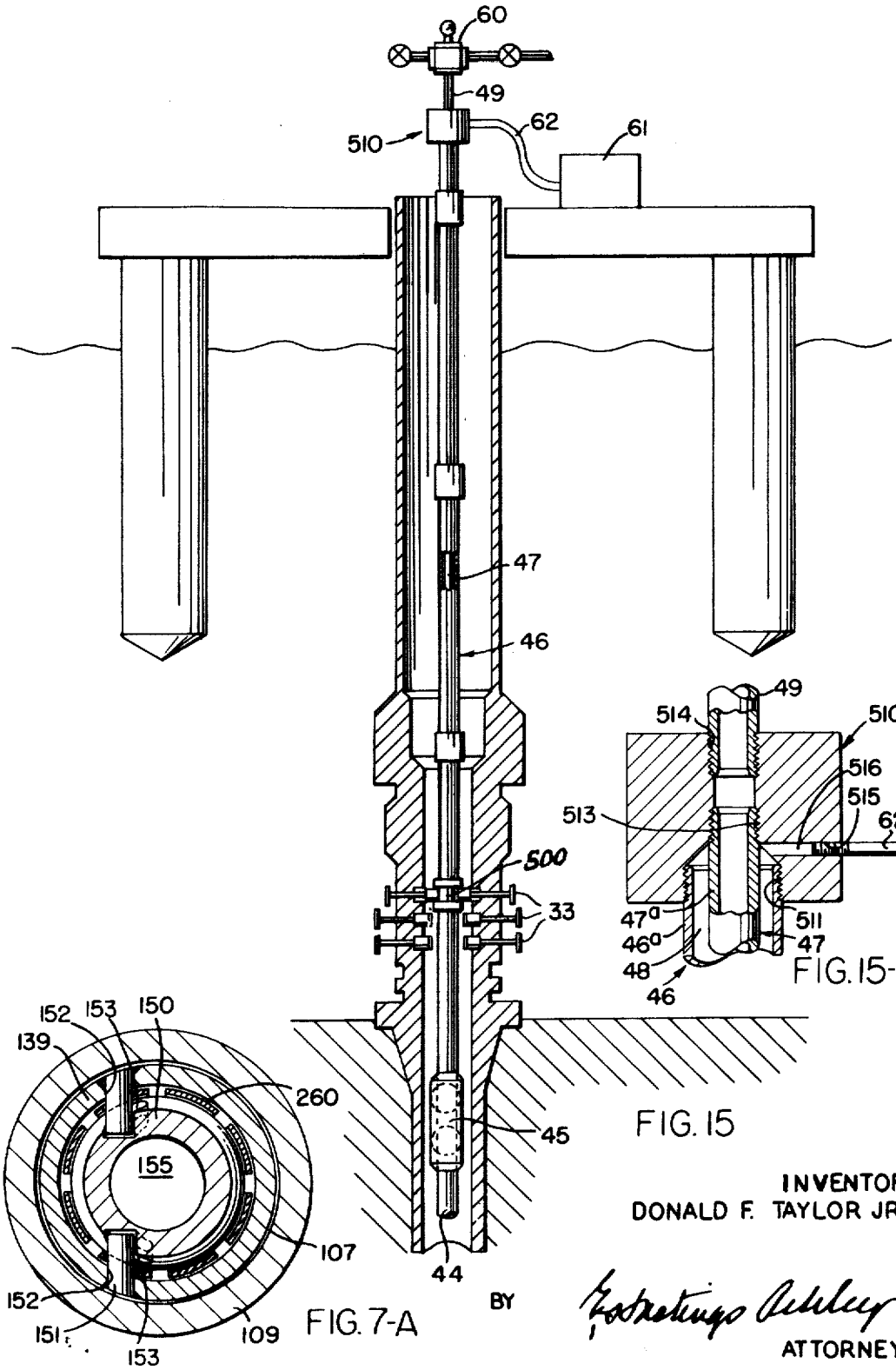
Figure 16:
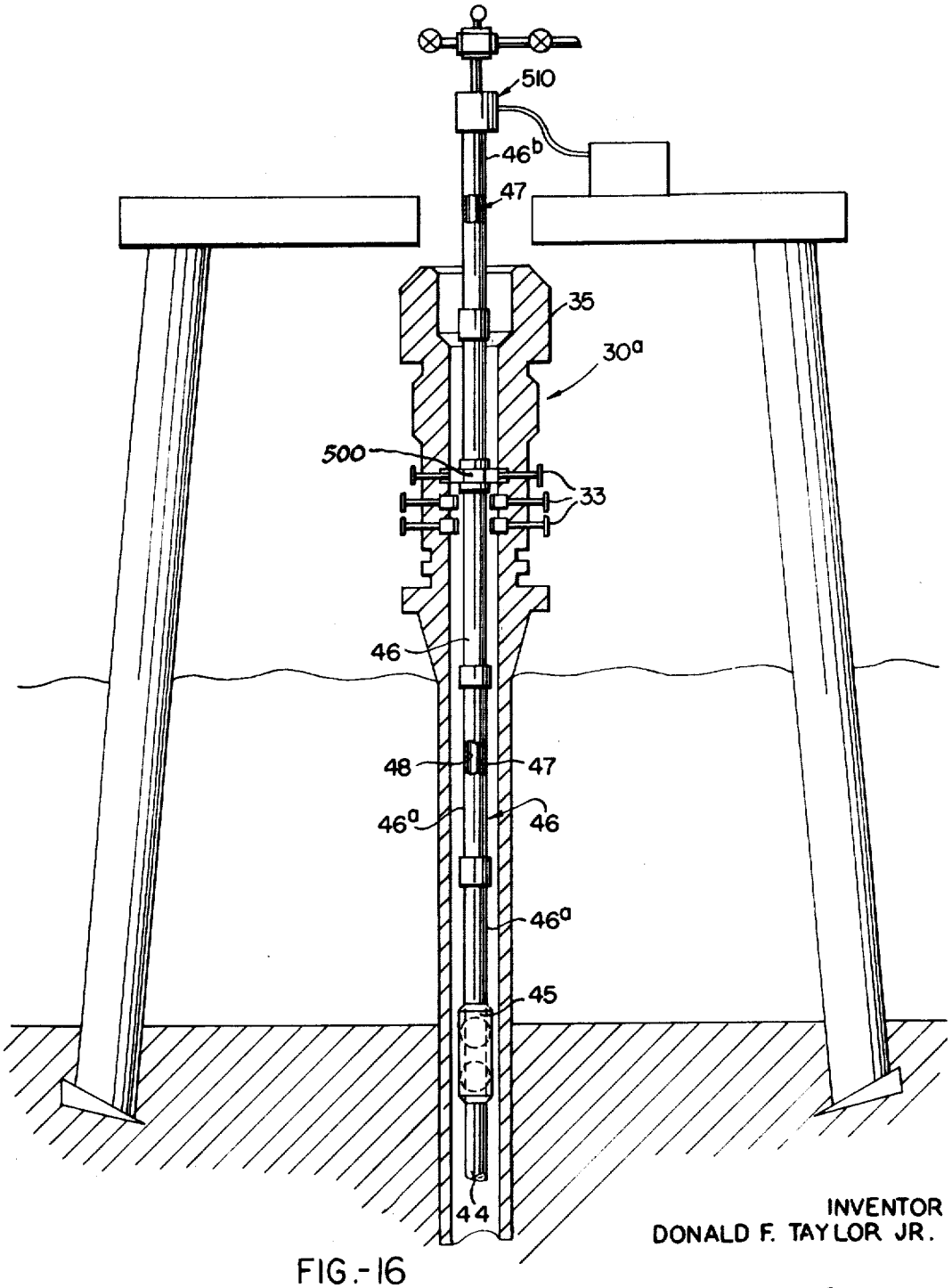

FIGURE 14-A is a fragmentary, partly sectional view of a modified connector head used in the flow conductor assembly of FIGURE 14;

FIGURE 15 is a vertical, partly sectional view of another modified form of the flow conductor assembly in the well installation;

FIGURE 15-A is a vertical, partly sectional, view of a connector head of the flow conductor assembly illustrated in FIGURE 15; and FIGURE 16 is a vertical, partly sectional view of still another modified form of the flow conductor assembly in a well installation.

Figure 1:
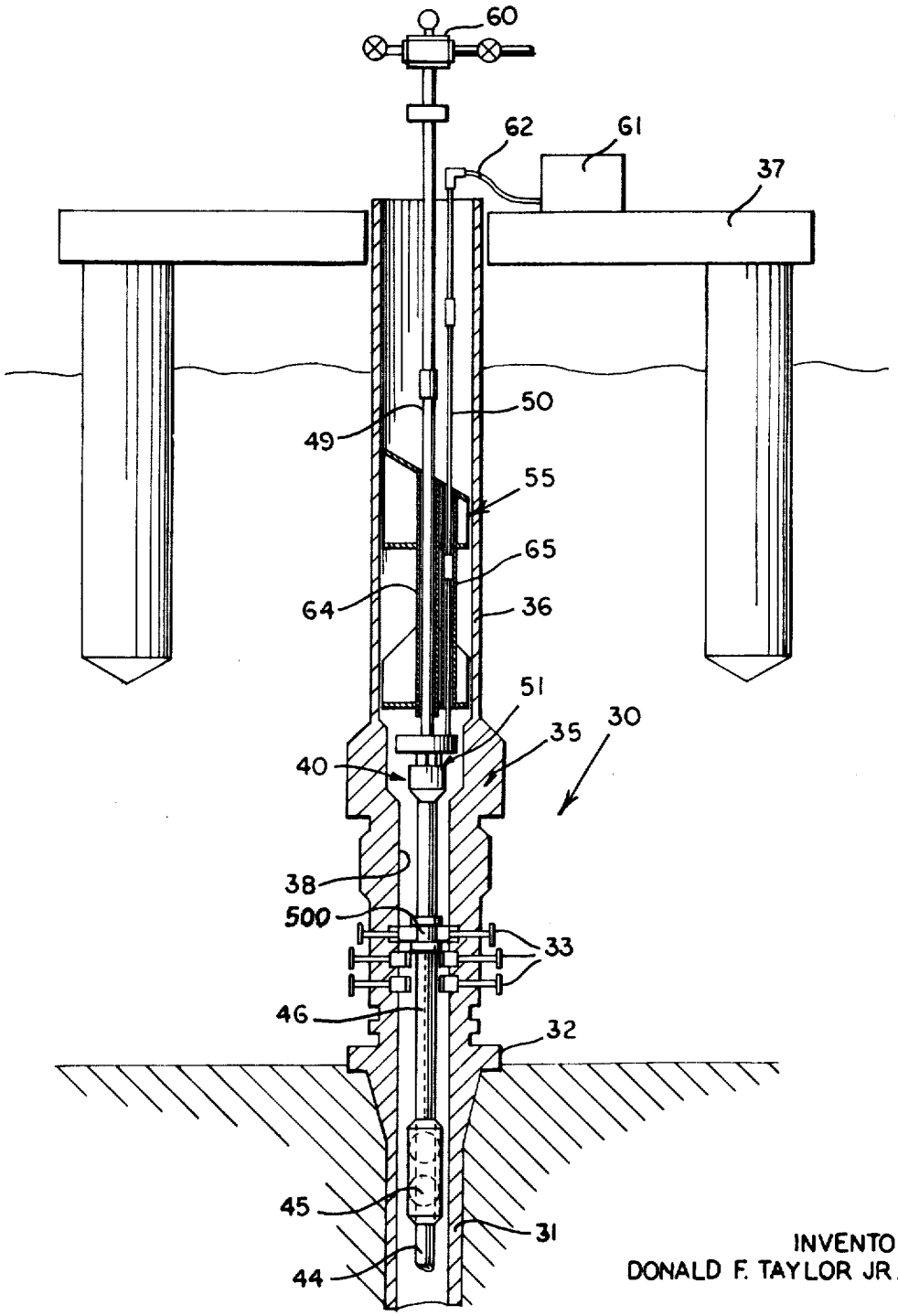
FIGURE 1 is a schematic illustration of a well installation with a flow conductor assembly embodying the invention extending therethrough.
Figure 2:
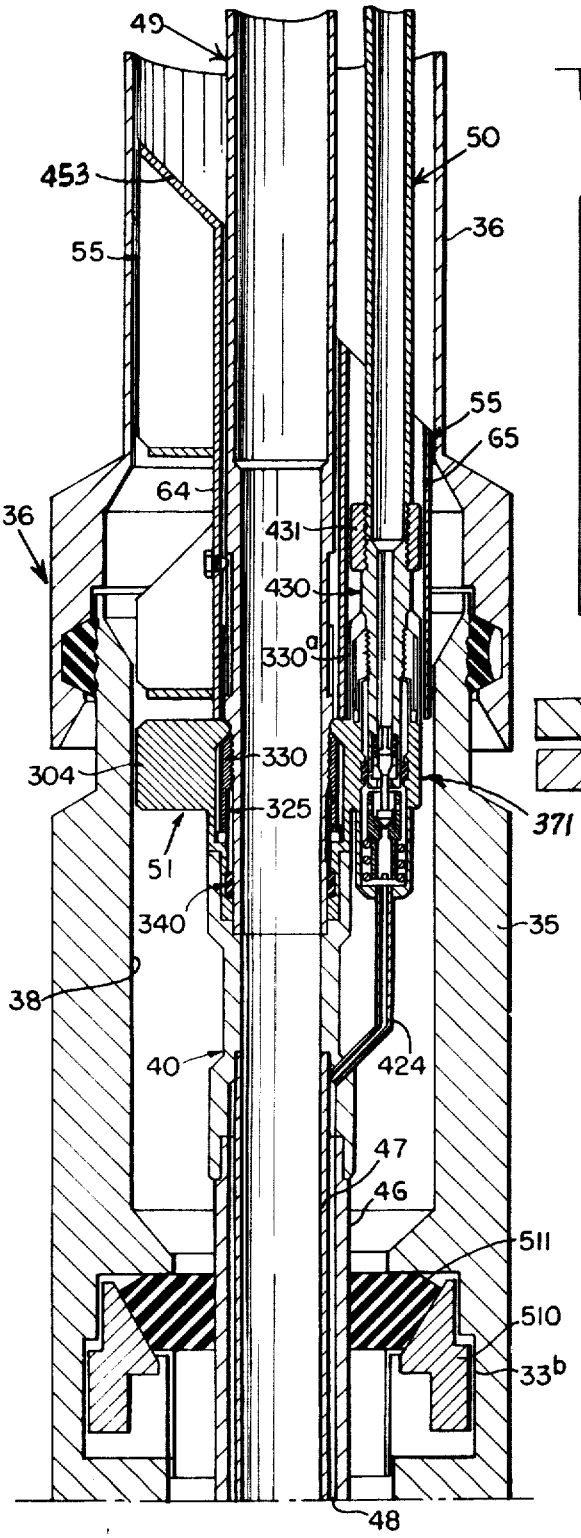
FIGURE 2 is an enlarged sectional schematic illustration showing an intermediate portion of the flow conductor assembly in position in the well installation.
Figure 3:
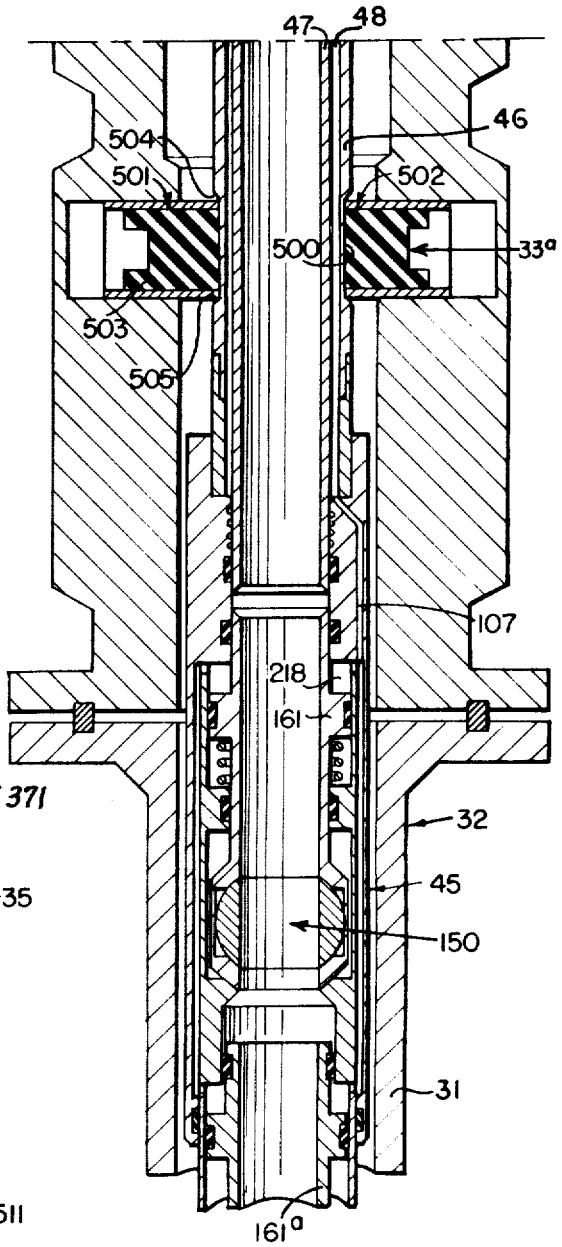
FIGURE 3 is a view similar to FIGURE [1] *2* being a continuation thereof showing a lower portion of the flow conductor assembly.

Referring now particularly to FIGURE 1 of the drawing, the well installation 30 at the bottom of a body of water, which is used during the drilling of the well, includes a casing 31 which is secured in the usual manner to a casing head 32, a stack of blowout preventers 33 mounted on the casing head, a latch head 35 mounted on the uppermost blowout preventer and a riser tube 36 releasably connected to the upper end of the latch head and extending above the surface of the water and through an aperture in a floating work platform 37. This well installation provides a longitudinal continuous passage 38 from above the surface of the water to the well through which a flow conductor assembly 40 may extend and be supported adjacent the bottom of the body of water by means of one of the blowout preventers 33. The blowout preventers may be of any well known and suitable type and be manually operable by divers or may be remotely operated, as for example, hydraulically, in which event the suitable control fluid lines would extend therefrom to the work platform. Such blowout preventers have means for holding a flow conductor which extends therethrough against movement and for sealing therebetween. The flow conductor assembly includes a string of tubing 44 which extends to any desired depth in the well and which usually has a packer (not shown) for closing the annulus between the tubing and the casing above a producing formation, a valve 45 which controls flow of fluids through the string of tubing, and a pair of concentric conductors 46 and 47 which provide an annular passage 48 for the flow of control fluid for controlling operation of the valve 45 connected to their lower ends. The lower end of the inner conductor 47 is placed in communication with the tubing string 44 when the valve 45 is opened. The flow conductor assembly also includes surface flow conductors 49 and 50 and a connector head 51 connected to the upper ends of the concentric conductors. The lower ends of the surface conductors 49 and 50 are releasably connected to the connector head 51 which establishes communication between the large surface conductor 49 and the inner flow conductor 47 and between the small or control fluid conductor 50 and the annular passage 48.

When the flow conductors 49 and 50 are to be secured to the connector head which is already in the passage 38 below the surface of the water, a guide 55 is secured to the large flow conductor 49 and is employed to properly orient the large flow conductor relative to the connector head and also to orient the guide relative to the connector head so that it will be in proper position to guide the lower end of the small conductor properly to the connector head for connection thereto.

In use, after the drilling operations have been completed and while the drilling well installation 30 is still in place and it is desired to perform short time production testing operations on the well, the string of tubing is lowered in the well from the floating working platform 37 by the usual well known equipment and, sequentially, the valve 45 is connected to the upper end of the string of tubing, the concentric flow conductors 46 and 47 are connected to the upper end of the valve, the connector head is connected to the concentric flow conductors and, if desired, the large and small surface flow conductors are releasably connected to the connector head as the string of tubing is lowered into place through the passage 38 into the well.

When the string of tubing and the flow conductor assembly 40 are in desired location in the well installation, at least one of the blowout preventers is operated to engage the outer flow conductor 46 to hold it against upward or downward movement in the well installation 30 and also to seal therebetween. Suitable surface control equipment 60 is connected to the upper end of the large flow conductor 49 to control the flow therethrough and the string of tubing 44 and to permit introduction of well tools into and from the large conductor 49.

Control fluid under pressure is supplied to the upper end of the control fluid conductor 50 and the annular passage 48 between the concentric conductors from a suitable control manifold 61 through a conduit 62 to control operation of the valve 45. Tools may be run through the flow conductor assembly and the tubing string to perforate the casing at the location of the producing formation and, if desired, cementing operations and the like may also be performed by use of the flow control assembly and the tubing string. The valve 45 is closed and opened as required by such operations.

The production of well fluids from such earth formation may then be tested by permitting their flow upwardly through the string of tubing to the surface. The valve may be closed at any desired time by decreasing the fluid pressure which is transmitted thereto from the manifold 61.

If it is necessary to remove the conductors 49 and 50 and the riser pipe 36 from the latch head, as due to the [occurence] *occurrence* of storm conditions at the location of the well, the valve 45 is closed and the pipes 49 and 50 are then detached from the connector head as by unscrewing them. The riser pipe is also detached from the latch head. The working platform itself may either be left anchored in place or removed prior to the arrival of the storm. The string of tubing, the valve, the concentric flow conductors and the connector head are now left supported in the well by the blowout preventer. Since the water conditions at the bottom of the body of water are always relatively quiet with little or no wave action, there is little likelihood that the portions of the flow conductor assembly left in the well will be damaged. The valve 45, which is below the blowout preventers, will close the upper end of the tubing in the event that the riser pipe and the flow conductors 49 and 50 are damaged or broken away from the connector and latch head, as in the event the work platform is struck by a vessel or a sudden storm or an unpredicted earthquake wave occurs. The latch head being of very strong construction will in all likelihood not be broken away when the riser pipe is so detached or broken away from it.

When the storm ceases or if for any other reason it is desired to come back and reconnect the flow conductors 49 and 50 to the connector head in order to perform further or additional operations on the well, the floating working platform 37 is again positioned over the well head assembly, the riser pipe 36 is connected to the latch head 35 and preferably any water within the well head assembly above the blowout preventer[s neck] *stack* is removed, as by pumping. The guide 55 is then mounted on the lowermost end of the large flow conductor 49 and is lowered through the riser pipe. The guide which includes a large tubular member 64 and a small tubular member 65 will not permit connection of the flow conductor 49 to the connector head 51 until the guide is so oriented relative to the connector head that its small tubular member 65 is properly positioned over the connector head to guide properly the small flow conductor 50 to the connector head. The large surface flow conductor is then connected to the [guide] *connector* head and subsequently the small flow conductor is lowered through the riser pipe and guided by the guide 55 to the connector head and again releasably attached thereto. Further operations then may be performed through the flow conductor assembly and the string of tubing, such as further production testing, cementing and the like.

The valve 45 includes an elongate tubular mandrel 100 which includes a top section 101 provided with *a reduced* internally threaded *bore* section 103 into which the lower end of the inner flow conductor 47 is threaded and an *enlarged upper* internally threaded section 102 in which the lower end of the outer flow conductor 46 is threaded. *The mandrel 100 also includes an upper cylinder section 137 whose upper end is threaded on the reduced lower end portion of the top mandrel section 101, an upper connector section 138 whose upper portion is threaded into the lower portion of the upper cylinder section 137, an upper operator section 139 whose upper reduced portion is threaded on the lower reduced portion of the upper connector section 138, a middle connector section 140 whose upper portion is telescoped into the upper operator section 139 and is threadedly secured into the lower end of said upper operator section, a lower cylinder section 141 whose upper end is threaded on the lower end of the middle connector section 140, a lower connector section 142 whose upper end telescopes into the lower cylinder section 141 and is threadedly secured thereto, a lower operator section 143 whose upper end is threaded on the reduced lower end portion of the lower connector section 142, and a bottom section 144 which extends into the lower end portion of the lower operator section and is threadedly connected therein. Each of the mandrel sections may be held against rotation relative to the other adjacent sections to which it is connected by means of set screws 145 and 146 which extend through end slots of one section into a threaded bore of the other. The upper and middle connector sections 138 and 142 have seal assemblies, which may include an O-ring 148 and a back up ring 149 positioned in external recesses in said sections and which seal between the connector sections and the mandrel sections into which they telescope. The middle connector section 140 also has a similar seal assembly which seals between it and the upper operator section 139, and the bottom mandrel section 144 has a similar seal assembly which seals between it and the lower operator section.*

*The top mandrel section 101 is provided with one or more vertical upwardly opening longitudinal passages 105 whose lower ends open through transverse bores 106 to an annular passage 107 between the mandrel 100 and an external sleeve 109 whose upper end portion is threaded on the reduced middle portion 110 of the top mandrel section. The upper end of the passage 107 is closed by a seal assembly 112, which engages the external surface 114 of the mid-portion of the top mandrel section below a downwardly facing annular shoulder 115 formed thereon and the internal surface 117 of the sleeve 109 above an upwardly facing shoulder 118 therein. The seal assembly may include an O-ring 113, a back-up ring whose downward movement is limited by its engagement with the shoulder 118, a pair of back-up rings on either side of the O-ring, and a thrust ring whose upward movement is limited by its engagement with the shoulder 115. The lower end of the annular passage 107 is similarly closed by a seal assembly 125 whose O-ring 126 engages the external surface 127 of the lower cylinder section 141 of the mandrel and the internal surface 128 of the sleeve below its internal annular shoulder 129. The seal assembly includes an upper back-up ring 131 whose upward movement is limited by its engagement with the sleeve shoulder 129, a pair of back-up rings on either side of the O-ring, and a thrust ring whose downward movement is limited by its engagement with the upwardly facing end surface or shoulder 135 of the seal assembly retainer member 136 threaded into the lower end of the sleeve 109.* [The top mandrel section is provided with one or more vertical opening longitudinal passages 105 whose lower ends open through transverse bores 106 to an annular passage 107 between the mandrel and a sleeve 109 whose upper end portion is threaded on the reduced lower end portion 110 of the top mandrel.

The upper end of the passage 107 is closed by a seal assembly 112 which may include an O-ring 113 which engages the external surface 114 of the top mandrel section below a downwardly facing annular shoulder 115 thereof and the internal surface 117 of the sleeve 109 above an upwardly facing shoulder 118 thereof. The seal assembly also includes a back-up ring 119 whose downward movement is limited by its engagement by the shoulder 118, a pair of back-up rings 121 and 122, and a thrust ring 123 whose upward movement is limited by its engagement with the shoulder 115. The lower end of the annular passage is similarly closed by a seal assembly 125 whose O-ring 126 engages the external surface 127 of the mandrel and the internal surface 128 of the sleeve below its internal annular shoulder 129. The seal assembly includes an upper back-up ring 131 whose upward movement is limited by its engagement with the sleeve shoulder 129, a pair of back-up rings 132 and 133, and a thrust ring 134 whose downward movement is limited by its engagement with the upwardly facing end surface or shoulder 135 of the seal assembly retainer member 136 threaded in the lower end of the sleeve.

The mandrel 100 includes an upper cylinder section 137 whose upper end is threaded on the reduced lower end portion of the top mandrel section 101, a connector section 138 whose upper portion is threaded into the lower portion of the upper cylinder section 137, an upper operator section 139 whose upper reduced portion is threaded on the lower reduced portion of the connector section 138, a connector section 140 whose upper portion is telescoped into the upper operator section and is threadedly secured into the lower end of upper operator section 139, a lower cylinder section 141 whose upper end is threaded on the connector section 140, a connector section 142 whose upper end telescopes into the lower cylinder section 141 and is threadedly secured thereto, a lower operator section 143 whose upper end is threaded on the reduced lower end portion of the connector section 142, and a bottom section 144 which extends into the lower end portion of the lower operator section and is threadedly connected therein. Each of the mandrel sections may be held against rotation relative to the other adjacent sections to which it is connected by means of set screws 145 and 146 which extend through end slots of one section into a threaded bore of the other. The connector mandrel sections 138, 142 and the bottom section 144 have seal assemblies which may include an O-ring 148 and a back up ring 149 positioned in external recesses thereof which seal between the connector sections and the mandrel sections into which they telescope. The connector section 140 has a similar seal assembly which seals between it and the upper operator section 139 and the bottom mandrel section has a similar seal assembly which seals between it and the lower operator mandrel section.]

The ball valve 150 is pivotally mounted in the lower operator mandrel section 139 by means of pins 151 whose outer portions are rigidly secured in suitable lateral bore 152 *in the wall* of the [mandrel] *upper operator* section 139 and whose inner portions extend into slots 153 of the ball. The engagement of the pivot pins 151 with the surfaces of the ball defining the slots which extend angularly relative to the central axis of the ball causes the ball to rotate substantially 90 degrees from its open position wherein its axial passage 155 extends longitudinally relative to the mandrel and a closed position wherein its passage 155 extends transversely relative to the longitudinal axis of the mandrel when the ball valve is moved upwardly a predetermined distance in the housing. The valve is moved between its lower open position and its upper closed position by an operator assembly 160 which includes a piston 161, a tubular piston member 162 whose upper end is connected to the piston, a tubular housing 163, upper and lower annular seats 164 and 165 disposed above and below the ball, and a pair of cooperative upper and lower locking rings 166 and 167 which hold the ball and the seats against displacement from the housing.

The tubular piston 161 includes a tubular upper extension 171 which extends upwardly into the top mandrel section 101 and on which are mounted two seal assemblies 175 which seal between external surfaces 173 of the upper extension and the internal surface 174 of the top mandrel section. Each of the assemblies may include a plurality of pressure sensitive type packing rings for sealing in both upward and downward directions as shown. Downward movement of the upper seal assembly 175 is limited by the upwardly facing end shoulder 176 of a retainer ring 177 whose downward movement is limited by engagement of its internal downwardly facing annular shoulder 178 with top surfaces of a plurality of ring segments 182 whose inner portions extend into an annular recess 183 of the piston extension. Upward movement of the upper seal assembly 175 is limited by the bottom annular shoulder 186 of a packing retainer ring 185. The retainer ring 185 may be secured to the top end of the packing extension in any suitable manner, as by means of pins 187 which extend through suitable lateral bores of the retainer ring into the lateral bores of the piston extension. Upward movement of the lower packing assembly on the piston extension is prevented by a back up ring 179 whose top annular surface engages the downward facing annular surfaces of ring segments 182 which extend outwardly beyond the limits of recess 183. Downward movement of the lower packing assembly on the piston extension 171 is limited by the upwardly facing shoulder 180 of the piston extension 171.

The lower end of piston 161 has upper and lower packing or seal assemblies 191 and 192 mounted thereon above and below its external annular flange 193. The seal assembly 191 may include a plurality of [packing] *packer* rings 194, a back up ring 195 which engages the top annular shoulder 196 of the flange 193 to limit downward movement of the [packing] *packer* rings, and a retainer ring 198 which limits upward movement of the packer rings. The retainer ring is secured to the piston by suitable pins 199 which extend through lateral apertures of the retainer ring into lateral bores of the piston. The lower seal assembly 192 similarly may include a plurality of packer rings 201 whose back up ring 202 engages the downwardly facing annular shoulder 203 of the piston flange 193 to limit upward movement of the packer rings on the piston. Downward movement of the packer rings is limited by a retainer ring 205 secured to the piston by pins 207 which extend through suitable lateral apertures of the retainer ring into lateral bores of the piston.

The upper end of the tubular piston member 162 telescopes into the enlarged lower portion of the bore of the piston and its upward movement into the piston is limited by the engagement of its annular external shoulder 211 with the downwardly facing internal shoulder 212 of the piston. The piston member is held releasably against downward movement relative to the piston by a split snap ring 214 whose inner portions extend into an external annular recess 215 of the tubular *piston* member and whose outer portions extend into the internal annular recess 216 of the piston.

The snap ring has an upwardly and outwardly inclined outer cam surface 217 whose engagement with the annular shoulder 217a of the piston defining the lower end of the recess [218] *216* when the piston member is forced downwardly relative to the piston causes the snap ring to contract and move inwardly into the recess 215 of the piston member and thus release the piston member for downward movement relative to the piston. The snap ring also has an upper external downwardly and outwardly inclined shoulder 217b whose camming engagement with the bottom end surface of the piston 161, as the piston member is telescoped upwardly into the piston, causes the snap ring to be moved resiliently inwardly into the recess 214 of the piston member. The snap ring moves resiliently outwardly into the piston recess 216 when it moves into alignment therewith.

The piston and the mandrel define an annular piston chamber 218 above the piston and below the bottom annular end surface 219 of the top mandrel section.

The annular passage 107 communicates with the piston chamber 218 through one or more lateral ports 220 of the upper piston [mandrel] section 137 *of the mandrel.*

The piston is biased upwardly by a pair of springs 221 and 222 disposed about the piston member in an annular spring chamber 223 between the piston member and the *upper* piston [mandrel] section 137. The upper end portions of the [spring] *springs* abut the downwardly facing annular shoulder 224 and 225 respectively, of a spring retainer ring 227 rigidly secured to the piston member by a plurality of screws 228 threaded in the lateral bores 229 of the spring retainer *and* whose pin end portions [230] extend into the apertures 231 of the tubular member. The lower ends of the springs engage the top annular shoulder 232 of the *upper* connector [mandrel] section 138.

Fluid may flow into and out of the spring chamber as the piston moves upwardly and downwardly in the mandrel through a plurality of ports 233 *in the wall* of the piston member.

The upper connector [mandrel] section 138 is provided with an internal annular downwardly opening recess 235 in which is disposed a seal assembly 236 which seals between the *upper* connector [mandrel] section and the tubular piston member below the ports 233 thereof. Upward movement of the seal assembly, which may include a plurality of packing rings 237 is limited by the downwardly facing annular shoulder 238 of the *upper* connector [mandrel] section and downward movement thereof is limited by an annular seal retainer ring 240 threaded in the lower enlarged end portion of the connector section. An O-ring 241 seals between the retainer [nut] *ring* and the *upper* connector [mandrel] section. The seal assembly 236 prevents upward flow of fluids into the spring passage and then inwardly into the tubular piston member when the ball 150 is in closed position.

The housing 163 has an upper annular portion 245 which is telescoped on the reduced lower portion 246 of the tubular piston *members* 162 and is rigidly secured thereto in seal tight relationship in any suitable manner, as by a weld 247. The upper annular seat 164 is disposed in the downwardly facing annular recess 250 of the housing and its upward movement in the housing is limited by the engagement of its top shoulder with an internal downwardly facing shoulder 252 of the housing. An O-ring 253 disposed in an upper external recess of the seals between the upper seal and the housing. The upper seat may have an annular seat ring 255 of a suitable hard surfaced low friction substance, such as is commercially available under the names "Hostaloy" and "Colmonoy," interposed between its internal annular arcuate surface 256 and the outer spherical surface of the ball 150. The seat ring may be bonded or otherwise suitably secured to the seat.

The housing has a plurality of dependent resilient collet fingers 260 which extend below the ball 150 and are provided with internal bosses 261 at their lower ends whose lower portions are received in an [internal] annular upwardly facing recess 262 provided by the lock rings 166 and 167. Outward movement of the lower ends of the collet fingers is limited by the engagement of the external surfaces of the bosses 261 with the internal annular shoulder 263 of the upwardly extending annular lock flange 266 of the lower locking ring 167. Upward movement of the collet fingers relative to the upper lock ring is limited by the engagement of the upper shoulders [267] of their internal bosses with the downwardly facing annular shoulder 268 provided by the external annular flange 269 of the upper lock ring.

The two lock rings are secured to one another by a plurality of socket head cap screws 270 which extend upwardly through suitable apertures in the lower lock ring into the downwardly opening threaded bores 271 of the upper lock ring. Lock washers 272 are interposed between the heads of the cap screws and the downwardly facing shoulders [274] provided by the downwardly opening bores 275 of the lower lock ring in which the heads of the cap screws are received.

Downward movement of the lower seat 165 is limited by the engagement of its bottom surfaces 278 with the top surface 279 of the upper lock ring 166. The lower seat has an internal upwardly facing annular arcuate surface 280 to which is bonded or otherwise suitably secured a seat ring 281 of a suitable low friction material which engages the spherical outer surface of the ball 150. The lower seat 165 is biased upwardly toward engagement with the ball by a plurality of springs 284 disposed in a plurality of downwardly opening circumferentially spaced bores 285 of the lower seat. The upper ends of the springs engage the downwardly facing surface [286] defining the upper end of the bore and their lower end portions engage the top surface 279 of the upper lock ring. The upper and lower lock rings have pins 288 whose inner portions are secured in suitable lateral bores of the lock rings and whose outer portions extend outwardly into the longitudinal slots 289 between the collet fingers *260* to engage the collet fingers and prevent rotation of the lock rings relative to the housing 163. The pivot pins 151 also extend to the recesses of the ball through two of the longitudinal slots 289. It will be apparent that the upper and lower seats, the ball and the upper lock ring 166 may be inserted upwardly into the housing 163 between the collet fingers whose lower end portions flex resiliently outwardly to permit such upward movement of these components and then flex inwardly as the top internal shoulders [267] of their bosses 261 move below the lower shoulder 268 of the upper lock ring flange 269. The lower lock ring is then moved upwardly to telescope its lock flange [263] *266* about the lower end portions of the collet finger bosses and is then secured to the upper lock ring by the cap screws 270 thus locking the collet fingers against outward movement.

Downward movement of the piston 162 and the housing is limited by the engagement of the *inclined* downwardly facing shoulder [289] *299* of the lower lock ring 167 with the internal upwardly facing shoulder 290 of the *middle* connector [mandrel] section 140.

The lower ball 150a and its operatively and structurally associated elements are similar in structure and mode of operation to the ball 150 and its operatively and structurally associated elements and, accordingly, the elements associated with the lower ball have been provided with the same reference numerals, to which the subscript a has been added, as the corresponding elements operatively associated with the upper ball 150. Fluid may flow between the passage 107 and the piston chamber 218a above the piston 161a via the ports 220a of the lower piston [mandrel] section 141. Downward movement of the *tubular* piston *member* 162a is limited by the engagement of the shoulder [289*a*] *299a* of the lower lock ring with the shoulder [293] 290*a* of the bottom mandrel section 144. The upward force exerted on the piston 162 by the springs 221 and 222 and the upward force exerted on the piston 162a by the springs 221a and 222a *and static pressure of fluids in the conductor 46 acting upwardly through the ports 233 and 233a on the underside of the pistons 161 and 161a* are greater than the static pressure of the fluids in the conductor 46 and in the passage 48 between the conductors 46 and 47 *acting downwardly on such pistons so* that the pistons will move upwardly and rotate the balls to their closed positions when the fluid in the small surface flow conductor is not maintained under pressure.

In use, when it is desired to open the two ball valves, the fluid pressure in the passage 107 is increased, as by pumping from control manifold 61, and when the downward force exerted on the pistons 161 and 161a by the fluid pressure in the piston chambers 218 and 218a exceeds the total upward force exerted on the pistons by the springs 221, 222, and 221a, 222a, any upwardly acting pressure differential across the balls and their pistons, and any frictional resistance present in the system due to these forces, the pistons will start to move downwardly. Continued pumping from manifold 61 will cause the pistons to continue to move downwardly until stopped by the engagement of the shoulders 289 and 289a of the lower lock rings 167 and 167a with the respective upwardly facing shoulders [290] *299* and [290a] *299a* of mandrel sections 140 and 144. Continued pumping from manifold 61 will produce an immediate pressure increase in the fluids being pumped and then may be seen on a pressure gauge in the fluid line 62 on the surface. The pressure required at the pistons 161 and 161a is approximately ten (10) percent greater than any well pressure acting to close the ball valves. During the downward movement of pistons within their limits of travel, the balls 150 and 150a rotate through substantially 90 degrees from a closed position wherein their axial passages 155 and 155a are out of alignment with the axial passages of the housing, the tubular piston members, the pistons, and the mandrel, to positions wherein they are in alignment with these axial passages to permit fluid flow through the valve.

If the pressure in the passage 107 is decreased below the value at which its force holds the pistons in their lower positions, the force of the springs, and of any upwardly acting pressure differential acting across the pistons and balls, moves the pistons and the balls upwardly in the mandrel thus causing the balls to rotate through substantially 90 degrees to positions wherein their axial passages 155 and 155a extend transversely relative to the longitudinal axis of the mandrel and the engagement of their outer surfaces with the seat members 255 and 255a then prevents upward flow of fluid through the mandrel.

Upward movement of the pistons 151 and [162] *161a* is limited by the engagement of the shoulders 294 and 294a of the housings 163 and 163a with the shoulders 295 and 295a of the packer nuts 240 and 240a respectively. Any upward pressure differential existing across the balls now tends to hold them in sealing engagement with the seat members. During the upward and downward movement of the balls, the lower and upper seats 164 and 164a and [166] *165* and [166a] *165a* of the two balls guide the rotational movement of the ball valves.

The balls when they are in their closed positions may be moved to open positions either by increasing the pressure within the annular passage 107 in the manner described above or by increasing the pressure within the inner string of tubing 47, as by pumping thereinto at the surface and therefore in the passage *through the tubular operator assembly* 160 above the upper ball 150. When the pressure within the inner tubing is increased to such value that its force acting across the upper ball 150 and the upper piston 161 exceeds the force of the upwardly acting pressure differential existing across the ball 150, the force of springs 221 and 222 and the force of the snap ring 214, the ball valve is moved downwardly and pulls the piston member 162 downwardly therewith, the camming engagement of the external lower cam shoulder 217 of the snap ring with the bottom shoulder 217a of the piston camming the snap ring inwardly into the recess 215 to permit such downward movement of the piston member relative to the piston. The piston is held against downward movement since the pressure in the chamber 218 is now considerably smaller than the pressure below the piston *acting upwardly on the piston through the ports 233 from the inner string 47*. As more fluid is pumped into the inner string 47, the ball 150 is moved downwardly and at the same time is rotated to at least partially open position admitting fluid pressure to the passage *through the lower tubular operator assembly* 160a above the lower ball 150a. The ball 150a and the piston member 162a are then moved downwardly relative to the piston 160a and the ball 150a rotates to at least partially open position. Once the two balls are in at least partially open position, fluids may be pumped downwardly through the valve and into the tubing 44 which is connected to the lower end of the bottom mandrel section 144 *by threads 144a*.

When the pumping is stopped and the pressure across the ball valves tends to equalize the springs 221a and [220a] *222a* move the [piston section 161a] *tubular valve member 162a* and the ball 150a upwardly and the springs 221 and 222 move the [piston] *tubular valve* member 162 and the ball 150 upwardly back to the positions illustrated in FIGURES 4, 5 and 6 of the drawings. As the snap rings 214 and 214a move into alignment with the internal recesses 216 and 216a of their associated pistons 161 and 161a, the snap rings move resiliently outwardly thereinto to releasably hold the piston members releasably secured to the piston. The engagement of the upper cam shoulders of the snap rings with the bottom end shoulders of the pistons of course cams the snap rings inwardly into the external recesses 215 to permit such upward telescoping movement of the upper end portions of the piston members into the pistons.

It will be apparent that the two balls are mounted in longitudinally spaced relation within the valve mandrel and in the event one of the balls fails to function properly and close when it is required to do so, that the other will close. The valve embodying the invention is therefore used wherever it is essential that flow through a flow conductor be stopped when this is necessary, as for example, in well installations where failure of the valve to close when a predetermined condition arises may cause very costly damage.

It will further be seen that a common control fluid pressure will operate both balls and that preferably the forces exerted by the springs 221 and 222 *and 221 and 222a* on the two pistons are equal so that both balls will tend to open when the fluid pressure within the annular passage 107 increases to a first predetermined value and will close when such pressure drops below a predetermined value.

It will further be seen that the valve is of relatively simple economical and compact construction even though it is provided with two separate means for effecting closure of the valve for extreme reliability of performance of the valve.

Referring now particularly to FIGURE 8, the connector head 51 includes a tubular latch housing 301 whose upper end is threaded into the enlarged lower portion 302 of the central passage 303 of a latch head 304. The latch head has an internal annular flange 305 which provides a downwardly facing annular stop shoulder 306, a lower upwardly and inwardly extending annular cam shoulder 307 and an upper upwardly and outwardly extending annular stop shoulder 308. The lower end of the latch housing is threaded in the enlarged upper portion 309 of a tubular connector sub 310. A tubular latch retainer 312 is mounted within the latch housing against longitudinal movement therein, its lower end being threaded in a retainer bushing 314 whose bottom external annular flange 315 is disposed below the annular lower end shoulder 316 of the latch housing and the annular upwardly facing shoulder 317 of the connector sub. The latch retainer has an external annular flange 319 at its upper end portion which is provided with a plurality of circumferentially spaced upwardly opening slots 320. The upper end of the external latch retainer flange is beveled or inclined upwardly and inwardly.

A latch 325 is mounted in the latch housing for limited longitudinal movement relative thereto and includes a base ring 326, a plurality of circumferentially spaced resilient collet or latch fingers 328 integral with and extending upwardly from the base ring and into the slots 320 of the external flange 319 of the latch mandrel. Each of the collet fingers is provided with internal longitudinally extending bosses 330 provided with thread teeth 331. The thread teeth have bottom surfaces 332 which extend substantially horizontally or perpendicularly to the longitudinal axis of the latch housing and with downwardly and inwardly extending upper shoulders or surfaces 333. Downward movement of the latch 325 is limited by the engagement of the bottom end surface of its base ring 326 with the annular top surface or shoulder 335 of the retainer bushing 314. The upper ends of the collet fingers are spaced below the cam shoulder 307 of the latch head when the latch 325 is in its lowermost [portion] *position*. When the latch [head] is moved upwardly in the latch housing, the upwardly and inwardly extending upper external cam shoulders 337 of the latch fingers move into engagement with the cam shoulder 307, *and* this camming engagement of the shoulders 337 and 307 will tend to cause the upper ends of the latch fingers to move inwardly. A seal assembly 340 is disposed in the connector sub and may include a plurality of packer rings 341 disposed between upper and lower adapter rings 342 and 343. Upward movement of the seal assembly is limited by the engagement of the top surface of the upper adapter ring with the bottom end surface of the retainer bushing 314 and its downward movement is limited by the engagement of the lower adapter ring with the upwardly facing annular shoulder 344 of the connector sub. The connector sub 310 is provided with an internal annular flange 346 which provides upper and lower stop shoulders 347 and 348. The upper end of the inner concentric flow conductor 47 is threaded in the reduced internally threaded portion 349 of the bore of the connector sub and the outer concentric flow conductor 46 is threaded in the lower enlarged internally threaded portion 350 of the connector sub. The connector sub has a lateral port 353 which opens to the bore of the connector sub through the shoulder 351 to the upper end of the annular passage 48 between the concentric flow conductors.

A latch mandrel 360 is connected to the lower end of the large flow conductor 49 to constitute its lower end portion by means of internal threads in its upper end portion. The lower end portion of the latch mandrel is telescopable downwardly through the central passage 303 of the latch head 304 into the latch housing and has external threads 362 which are engageable with the threads 331 of the latch fingers. The upper shoulders or surfaces 363 of the threads 362 extend substantially perpendicularly to the longitudinal axis and their lower surfaces 364 extend upwardly and outwardly. When the lower end of the latch mandrel is inserted through the passage 303 of the latch head the reduced portion 365 of the latch mandrel below the threads 362 moves past the latch finger threads and thereafter the lower shoulders 364 of the teeth of the latch mandrel engage the upper surfaces 333 of the teeth 331 of the latch fingers and cam the upper ends of the latch fingers outwardly to permit further downward movement of the latch mandrel. When the downward telescoping movement of the latch mandrel is arrested due to the engagement of its annular stop shoulder 367 with the upper stop shoulder 308 of the latch head, the latch mandrel teeth 362 are in threaded engagement with the teeth 331 of the latch fingers and the seal assembly 340 sealingly engages the reduced portion 365 of the latch mandrel to seal between the connector sub 310 and the latch mandrel 360. Due to the provision of the substantially horizontal bottom surfaces 332 of the latch finger teeth and similar top surfaces 363 of the latch mandrel teeth 362, upward nonrotational movement of the mandrel relative to the latch cannot now take place. Any upward movement of the latch mandrel will now cause the latch 325 to move upwardly and as the cam shoulders 337 of the latch fingers engage the internal cam shoulder 307 of the connector head, their camming engagement tends to force the upper ends of the latch fingers inwardly and prevents disengagement of the latch mandrel from the connector head except by rotation thereof relative to the connector head and therefore to the latch 325 which is held against rotation by the retainer 312 into whose slots 320 extend the internal bosses 330 of the latch fingers.

The latch head 304 has a vertical bore 370 radially spaced from its longitudinal axis in which is rigidly secured an elongate housing 371 which includes an upper latch section 372, an intermediate connector section 373 and a valve housing section 374. The connector section has an upper portion 376 which is threaded in the lower end of the latch housing section 372 and an external intermediate flange [378] whose downwardly facing annular shoulder 379 engages an internal upwardly facing annular shoulder 380 of the connector head to limit downward movement of the connector section in the bore 370. The connector section has an externally threaded intermediate portion 382 which is secured to the internally threaded portions 383 of the latch head 304 below its shoulder 380.

A latch retainer 312a and a latch 325a mounted in the elongate housing are similar in structure and operation to the retainer 312 and the latch 325 and, accordingly, have been provided with the same reference characters, to which the subscript a has been added, as the corresponding elements of the latch retainer 312 and the latch 325, respectively. Downward movement of the latch 325a in the latch housing section 372 is limited by the engagement of its base ring 326a with the top end surface or shoulder 385 of the connector housing section 373. The lower externally threaded end portion of the retainer 312a is threaded in the enlarged threaded upper end portion of the central bore or passage 388 of the connector housing section. Upward movement of the latch 325a is limited by the engagement of the cam shoulders [337*a*] of its latch fingers 328a with the annular upwardly and inwardly extending cam shoulder 307a of the latch housing section 372. The connector housing section has an internal annular flange 390 which provides an upper top shoulder 391 and a downwardly facing stop shoulder 392.

A seal assembly 394 is disposed on the bore 388 of the connector housing section below the flange *shoulder* 392 and may include a plurality of packing rings 395 disposed between a pair of upper and lower adapter rings 396 and 397. Upward movement of the seal assembly is limited by the engagement of the upper adapter ring with the stop shoulder 392 and its downward movement is limited by the engagement of the lower adapter ring with a retainer ring 398 whose upward movement in the bore 388 is limited by the engagement of its top surface with the downwardly facing annular shoulder 399 of the connector housing section. The top end surface of the valve housing section 374, which is threaded in the lower portion 400 of the connector housing section, limits downward movement of the retainer ring 398. The valve housing section 374 is provided with an external outer recess in its upper end portion in which an O-ring 401 is disposed and seals between the valve and connector housing sections.

A valve 402 is mounted in the valve housing section for controlling flow of fluids through the passage 388 and thus through the housing 371 and includes elongate tubular body 404 which is biased upwardly toward closed position by a spring 405 disposed about the valve body. The lower end portion of the spring bears against the bottom upwardly facing shoulder or surface [408] *406* of the valve housing section 374 and its upper end portion bears against the bottom annular shoulder of an external annular flange 408 of the valve body.

The valve body has an upper reduced externally threaded end portion 410 on which is threaded the lower end portion of a check valve housing 411. An O-ring 413 disposed in an external annular recess of the valve body seals between the check valve housing and the valve body. A check valve 412 mounted in the housing is biased downwardly into engagement with the annular seat surface 414 of the valve body by a spring 415. The stem 416 of the check valve extends upwardly of the check valve housing through an aperture in its top. The spring bears against an annular upwardly facing shoulder of the check valve and a downwardly facing shoulder of the check valve housing. The check valve when in its lower closed position in seated engagement with the seat 414 prevents flow from the lateral ports 417 of the check valve housing into the upper portion of the central passage 418 of the valve body above the lateral ports 419 which communicate with the passage 418 and which extend through the flange 408 thereof. The engagement of the upper surface of the flange 408 with the ring 398 limits upward movement of the valve body in the housing. When the valve 402 is in its upper position in the body, the seal assembly 394 sealingly engages the check valve housing 411 and thus closes the housing passage to flow *of* fluids therethrough.

The downwardly opening port 422 in the bottom of the valve housing section 374 is in communication with the port 353 of the connector sub 310 through a conduit 424 whose opposite ends are connected to the valve housing section and the connector sub by means of suitable fittings or connectors 425 and 426 threaded into the outer threaded portions of the ports 422 and 353. The check valve 412 when in its upper position will of course permit flow of fluids upwardly therethrough from the passage 418 when the pressure in the housing section below the seal assembly rises to permit escape of fluids from the housing and thus from the passage 48.

A latch mandrel and valve assembly 430 (*Figure 12*) connectable to the lower end of the small surface flow conductor 50 by a connector guide 431, is telescopable downwardly into the upper end of the housing 371 and includes a latch mandrel 432 provided with external threads 433 whose lower upwardly and outwardly inclined surfaces 434 are adapted to engage the upper downwardly and inwardly inclined surfaces or shoulders 333a of the teeth 331a and cam the resilient latch fingers 328a outwardly to permit downward movement of the threads relative to the teeth and whose substantially horizontally extending shoulders 435 adapted to engage the substantially horizontally extending bottom shoulders or surfaces 332a of the teeth 331a to prevent upward movement of the latch mandrel relative to the latch 325a. The upper ends of the latch fingers 328a are cammend resiliently outwardly during downward movement of the threads 433 therepast and then move resiliently inwardly to engage the threads 433 to prevent upward non-rotational movement of the assembly 430.

A valve housing 438, threaded on the lower reduced end portion 439 of the latch mandrel 432, has a reduced lower portion 441 which is engageable by the seal assembly 394 and a downwardly facing stop shoulder 440 which is engageable with the stop shoulder 391 of the flange 390 of the connector 373 to limit downward movement of the latch mandrel and valve assembly in the housing 371. A valve 442 slidably mounted in the housing 438 has an external annular recess in which is disposed an O-ring 444 which sealingly engages with the internal seal surface 445 of the valve [section] *housing* 438 when the valve is in its lower closed position wherein its downward movement is stopped by the engagement of its downwardly facing annular shoulder 447 with the internal upwardly facing annular shoulder 448 of the housing 438. The valve is biased to its lower position by a spring 449 whose lower end engages the top annular shoulder of an external annular flange 451 of the valve and whose upper end portion engages the downwardly facing annular end surface or shoulder 452 of the latch mandrel 432. The spring extends about a tubular upper extension 454 of the valve. The flange 451 is provided with longitudinal slots 455 and the tubular extension is provided with lateral ports 456 opening to the slots to facilitate flow through the valve housing when the valve is in its open position.

The valve has a downwardly extending reduced or rod portion 458 whose bottom end is adapted to engage the top end of the stem 416 of the check valve 412 as the tubular body 432 is telescoped downwardly into the elongate housing 371 and after the reduced lower end portion [439] *441* of the valve housing has moved into sealing engagement with at least the upper portion of the seal assembly 394 so that very little fluid which might be present in the passage 388 of the elongate housing 371 above the check valve housing 411 will be permitted to flow downwardly. Since the spring 449 which biases the valve 442 downwardly is weaker than the spring 405 which biases the valve 402 upwardly, the valve 442 will be moved upwardly to its open position before the lower end surface of the valve housing 438 engages the top surface of the check valve housing 411 to permit upward flow of fluid which may be trapped in the passage 388 between the lower end of the valve housing 438 and the check valve housing 411.

The large and small vertical tubular members 64 and 65 of the guide 55 are rigidly connected to one another by a bottom plate 451, an intermediate plate 452 and [a] *an inclined* top plate 453. The large tubular extends through the aligned apertures 455, 456 and 457 of the plates with the lower end portion of the large tubular member extending below [a] *the* lower bottom plate 451 and with its top surface coplanar with the top surface of the inclined top plate. The small tubular member 65 similarly extends through aligned apertures 459, 460 and 461 of the bottom, middle and top plates with its bottom surface being coplanar with the bottom surface of the bottom plate and with its top surface being coplanar with the top surface of the inclined top plate.

Vertical plates 464 and 465 extend radially outwardly from the large and small tubular members between the top and [bottom] *intermediate* plates respectively and vertical plates 466 and 467 whose bottom edges rest on the bottom plate extend radially outwardly from the large and small tubular member respectively. These components of the guide are secured to one another by welding.

The guide is releasably securable to the latch mandrel 360 by one or more pins 470 threaded in suitable lateral bores 471 of the large tubular member 64 whose inner portions are receivable in the annular external recess 474 of the latch mandrel 360. The latch mandrel 360 also has a pair of vertical external slots 475 in which the pins are receivable and which open upwardly to the recess 474.

Upward movement of the guide on the latch mandrel is limited by the engagement of the pins with the upwardly facing surfaces 477 of the latch mandrel defining the lower ends of the slots and downward movement of the guide on the latch mandrel is limited by the engagement of the pins with the downwardly facing annular shoulder 478 defining the upper end of the latch mandrel recess 474.

When the large flow conductor 49 is to be connected to the connector head 51 which is already in place in the latch head 35 of the well installation 30, the latch mandrel 360 is secured to the lower end of the large flow conductor and inserted into the large tubular member 64 of the inner guide, and the pins 470 are then rotated to move their *end* portions inwardly into the recess 474 of the outer concentric conductor 46. The guide is then supported on the latch mandrel as the large flow conductor is lowered downwardly through the riser pipe 36. The guide now holds the large flow conductor centered within the riser pipe so that it will be aligned vertically with the passage 303 of the latch head 304. If the small tubular member 65 of the guide is not properly aligned with the upper latch section 372 of the elongate housing 371 of the connector head, downward movement of the guide is arrested by the engagement of the top end shoulder of the elongate housing with the bottom plate 451 of the guide. The large flow conductor and the latch mandrel can then continue downward movement relative to the guide and to the connector head until the pin [472] *470* engage the [top] shoulder 478 of the latch mandrel. At this time [time] the latch mandrel is in the position illustrated in FIGURE 13 relative to the connector head with its threads 362 located above the connector head so that the latch mandrel cannot be connected to the connector head 51. The large flow conductor is then raised and rotated until the pins 472 are received in the upper ends of the slots 475 of the latch mandrel. Rotation of the large pipe is continued until the small tubular member of the guide, which is now supported on the latch section [472] *372*, moves into vertical alignment with the latch section whereupon the guide moves by gravity downwardly until its downward movement is arrested by the engagement of the bottom end surface of the large tubular member 64 with top surface of the latch head 304 or by the engagement of the pins 470 with the latch mandrel shoulder 478. The latch mandrel can then move downwardly through the passage 303 and its threads 362 engage the teeth 331 of the bosses 330 of the fingers of the latch 325. The downward movement of the latch mandrel and [therefore] *therefore* of the large flow conductor 49 is then arrested due to the engagement of the latch mandrel shoulder 367 with the shoulder 308 of the latch head 304.

It will thus be seen that the guide is used both to align the latch mandrel and large flow conductor with the passage 303 of the latch head 304 of the connector head and also to properly orient the small tubular member [465] *65* of the guide with the elongate housing [372] *371* of the connector head so that when the latch mandrel and valve assembly 430 connected to the lower end of the small flow conductor 50 are thereafter lowered through the riser pipe, the inclined plate [62] *453* will guide the lower end of the latch mandrel and valve assembly into the upper end of the small tubular member 65 and therefore into alignment with the upper end of the upper latch section of the elongate housing [375] 371. The latch mandrel and valve assembly will then telescope into the upper end of the elongate housing and be secured thereto by the engagement of the threads [434] *433* thereof with the teeth 331a of its latch 325a. As the valve housing 438 moves downwardly through the passage 388 [of], the bottom end of its valve rod 458 engages the top end of the stem 416 of the check valve *412* and the valve 442 is moved to open position as the valve housing continues to move downwardly. The bottom end of the valve housing then engages the top end of the check valve housing whereupon the continued downward movement of the valve housing moves the valve 402 downwardly against the resistance of the spring 405. As the check valve housing moves out of sealing engagement with the seal assembly 394, the reduced end portion [442] *441* of the valve housing moves into engagement with the seal assembly. Communication is now established between the lower end of the passage 388 and the central longitudinal passage of the latch mandrel and valve [housing 432] *assembly 430*.

Such downward movement of the latch mandrel and valve assembly 430 continues until the shoulder 440 of the valve housing 438 engages the internal shoulder [347] *391* of the connector sub. At this time the threads 433 of the latch mandrel are in full engagement with the threads 331a of the latch 325a and this engagement of the latch mandrel threads and the latch threads now prevents nonrotational upward movement of the latch mandrel from the elongate housing [372] *371*. The latch mandrel may then be disconnected only by rotating the latch mandrel to unscrew its threads *out* of engagement with the thread teeth of the latch fingers of the latch 325a.

In use, after the well has been drilled and the well installation 30 which has been used in drilling the well, including the drilling phase stack of blowout preventers 33, is still in place, the string of tubing 44 is made up and lowered into the well installation 30 through the riser pipe 36 and the latch head 35. As the tubing string is lowered into the well installation the upper end of the string of tubing is threaded into the lower threaded portion 294 of the bottom section 144 of the mandrel 100 of the valve 45, and the lower ends of the inner and outer concentric conductors 47 and 46 are threaded into the *threaded* [portion] *portions* 103 and 102, respectively, of the top section 101 of the mandrel and their upper ends are threaded in the internally threaded portions 349 and 350, respectively, of the connector sub 310 of the connector head 51. The large flow conductor 49 is then releasably secured to the connector head by the latch mandrel 360 which is secured to its lower end and similarly the small or control fluid conductor 50 is secured to the connector head by means of the latch mandrel and valve assembly [330] *430* which is secured to its lower end by the guide connector 431. A suitable fluid, such as a light oil, is introduced into the passage 105 of the valve 45, the passage 48 provided by the concentric flow conductors, the tube 425 and the small flow conductor 50 as these components are connected to one another. This assembly of the tubing string 44, the valve 45, the concentric conductors 46 and 47, the connector head 51 and the large and small flow conductors 49 and 50 is lowered to a position wherein the external annular recess 500 of the outer concentric flow conductor 46 is aligned with one of the blowout preventers 33. Such blowout preventer 33a may be any suitable type, as for example the type illustrated on pages 1134 through 1140 of the Composite Catalogue of Oil Field Equipment and Services, 1964–65 edition, published by World Oil, Houston, Tex., which has a pair of rams 501 and 502 which are movable toward each other and each is provided with resilient seal elements 503. The rams are adapted to engage the top and bottom shoulders 504 and 505 respectively of the outer concentric conductor 46 defining the recess 500 when in operative engagement with the outer conductor to prevent either upward or downward movement of the outer concentric flow conductor 46. Others of the blowout preventers 33, such as the blowout preventer **33*b*, may be of the type illustrated on pages 2575–2579 of the Composite Catalogue, which employ a contractor piston 510 to urge an annular sealing element or packing 511 into sealing engagement with a flow conductor, such as the outer flow conductor 46 to seal therebetween and close the passage 38. The blowout preventers are now operated to close the annular passage or annulus 38** and also hold the outer flow conductor against longitudinal movement.

Any desired production testing operations may now be performed using the well [insulation] *installation* 30 previously used to drill the well. For example, various well tools [such as well tools] may be moved downwardly through the large flow conductor 49, after the valve 45 has been opened by [measuring] *maintaining* the pressure of the control fluid by means of the manifold 61 and the conduit 62 connected to the upper end of the control conductor 50. The rate of flow and volume of flow of the well fluids into the well through perforations in the casing may then be tested by permitting them to flow upwardly through the string of tubing to the surface. If it is desired or necessary to pump fluids, such as cement, acid or the like, into the well through the string of tubing, the balls of the ball valve may be maintained in open position by maintaining proper fluid pressure from the manifold 61 to the valve 45 or, if such pressure is not available, by pumping downwardly into the large flow conductor into the passages *of the operator assemblies 160 and 160a* of the ball valve 45 in the manner described above.

If it is necessary or desirable to disconnect the flow conductors 49 and 50 from the connector head and the riser pipe 36 from the latch head 35 due to the occurrence of the storm conditions, before any such desired operations have been completed, the pressure manifold is operated to *relieve* or remove the pressure [to] *in* the small flow conductor 50, which causes the valve 45 to close. The large flow conductor 49 is rotated to cause the threads 362 of its latch mandrel 360 to unscrew from the thread teeth 331 of the latch 325 of the connector head, and then similarly the small flow conductor 50 is rotated to cause the teeth 433 of its latch mandrel 432 to disengage from the teeth 331a of the latch 325a. As the latch mandrel and valve assembly 430 on the lower end of the small flow conductor is moved upwardly from the elongate housing 371 of the connector head, the valve body 404 moves upwardly to closed position so that no salt water may then flow downwardly thereinto. Once the two flow conductors 49 and 50 are removed from the well installation, the riser pipe may also be disconnected from the latch head 35.

The tubing 44 is thus left supported in the well by the blowout preventers. The valve now prevents any water from flowing into the tubing and prevents any of the well fluids from flowing upwardly out of the tubing.

If it is thereafter desired to reconnect the large and small flow conductors to the connector head in order that any such interrupted operations may be completed or others initiated, the latch head 360 is inserted through the large tubular member 64 of the guide 55, and the pin 470 are then rotated to move their inner end portions into the annular recess 474 of the latch mandrel 360. The pins are preferably moved into the slots 475 so that during the lowering of the latch mandrel and the large flow conductor 49, the guide is in its lowermost position on the latch mandrel. The guide 55 holds the large flow conductor centralized within the riser pipe 36 during the lowering thereof through the riser pipe to the connector head and holds the latch mandrel in position wherein its lower end is aligned with the passage 303 of the connector head 51 and will enter thereinto. If the small tubular member 65 is not aligned with the upper latch section 372 of the elongate housing 371 of the connector head 51, the bottom plate 451 of the guide engages the top of the latch section and downward movement of the guide is now arrested. Continued downward movement of the large flow conductor and the latch mandrel 360 will then cause the lower reduced portion 365 of the latch mandrel to [ented] *enter* into the passage 303 of the latch head 304 of the connector head 351. The engagement of the pins 470 with the top shoulder 478 of the latch mandrel defining the upper end of the recess 474 then stops further downward movement of the latch mandrel before its threads 362 enter into the passage 303 and into engagement with the thread teeth 331 of the latch fingers of the latch 325. An upward force then imparted to the large flow conductor causes it to move upwardly relative to the guide. The large flow conductor is rotated as it is moved upwardly to cause the ends of the pins to be received in the upper ends of the slots 475. Once the pins are received in the slots, rotation of the large flow conductor will also cause rotation of the guide and, as the guide is rotated and its small tubular member 65 moves over and into alignment with the elongate housing 371, the elongate housing will no longer support the guide and the guide will drop down, the small tubular member 65 telescoping over the upper latch section 372. The guide is then supported on the latch head 304 of the connector head by the engagement of the bottom end shoulder of its large tubular member 64 therewith or is then supported on this latch mandrel 360 by the engagement of the inner portions of its pins 470 with the shoulder [477] *478* of the latch head 360 defining the [lower] *upper* end[s] of the [slots 475] *recess 474*.

The large flow conductor is then lowered and the threads 362 of the latch mandrel engage the teeth 331 of the latch 325 so that the large flow conductor and latch mandrel is then rigidly connected to the latch head against upward nonrotational movement. At this time the guide rests on the latch head 304 due to the engagement of the bottom end shoulder of the large tubular member 64 with the latch head.

The latch mandrel and valve assembly 430 is then connected to the lower end of the small flow conductor 50 and is lowered through the riser pipe. The small flow conductor is preferably filled with a suitable fluid, such as light oil, after the latch mandrel and valve housing assembly is connected to its lower end. When the lower end of the valve housing [432] *438* moves into engagement with the top inclined plate 453 of the guide at any location above the upper end of the small tubular member 65, the top plate guides the valve housing toward the upper end of the small tubular member and when it moves into alignment therewith, the latch mandrel and valve assembly moves downwardly therethrough and is guided thereby into the central passage 388 of the elongate housing 371. As the latch mandrel and valve assembly move downwardly through the elongate housing 371, the valve 442 in the valve housing 438 is opened when it moves into engagement with the valve stem 416 of the check valve 412 and [its] *the* reduced lower end portion *441 of the* valve housing moves into sealing engagement with the seal assembly 394 and then moves the valve body 404 downwardly so that the check valve housing 411 moves out of sealing engagement with the seal assembly 394. Fluid communication is therefore now established between the lower end of the small flow conductor 50 and the annular passage 48 provided by the concentric flow conductors 46 and 47 and therefore with the passage 107 of the valve 45 through the valve housing section 404 and the tube *424*.

Any desired well operations can now again be performed, the vavle 45 being opened and closed as required by controlling the fluid pressure transmitted through the small flow conductor 50 to the valve 45.

If it is thereafter again desired to detach the large and small surface flow conductors 49 and 50 from the connector head, the small flow conductor is first rotated to unscrew the threads 433 of its latch mandrel 432 from the thread teeth 331a of the latch 325a. After the small flow conductor has been removed from the well, the large flow conductor is rotated to disengage the teeth 362 of its latch mandrel 360 [with] *from* the teeth 331 of the latch 325 whereupon the large flow conductor 49 may be removed to the surface. As the large flow conductor and latch mandrel 360 move upwardly from the connector head the pins 470 engage either the bottom shoulder 479 defining the lower end of the annular recess 474 thereof or the [shoulder] *shoulders* 477 defining the lower ends of [their] *the* slots 475. The guide is thus moved upwardly with the latch mandrel to the surface.

It will be apparent that once the string of tubing 44, the valve 45 and the concentric flow conductors 46 and 47 are positioned in the well and held by the blowout preventers 33, the large and small surface flow conductors may be readily disconnected therefrom and reconnected thereto as required leaving the valve positioned below the blowout preventers, *and* the ball valve keeps the upper end of the string of tubing closed to flow of fluids therethrough when the small flow conductor is not connected to the connector head. The blowout preventers of course close the passage 38 of the well installation 30 about the outer concentric flow conductor 46.

Referring now particularly to FIGURES 14 and 14–A, the large and small flow conductors may be connected to the inner and outer concentric flow conductors 47 and 46 by means of a connector head [500] *509*. The lower end of the large flow conductor 49 is threaded into the upper internally threaded portion 501 of the connector *head* and the lower end of the small flow conductor 50 is threaded in the upper threaded portion 502 of a passage 504 of the connector head which opens to the interior of the head at the internal annular shoulder 505 thereof between the threaded portions 507 and 508. The inner concentric [flow] *flow* conductor 47 has its upper end threaded in the threaded portion 507 of the head and the outer concentric conductor 46 has its upper end threaded in the lower threaded portion 508 of the head. Control fluid may flow into the annular space 48 between the concentric conductors through the small flow conductor and the passage 504 of the head and thence to the valve 45.

It wil be apparent that in the event storm conditions arise or it is necessary to quickly disconnect the surface flow conductors 49 and 50 from the head [500] *509*, the conductors 49 and 50 must be unscrewed from the connector head, and thereafter it will be necessary to pull the head [500] *509*, the concentric flow conductors and the string of tubing to the surface to enable the flow conductors 49 and 50 to be threaded into the head.

Referring now to FIGURE 15, the concentric flow conductors 46 and 47 may have additional sections 46a and 47a, respectively, connected thereto to extend to the surface with the uppermost sections 46a and 47a being connected to a head 510. The topmost section of the outer flow conductor 46 is threaded in the lower threaded portion 511 of the head and the uppermost section of the inner concentric flow conductor 47 is threaded in the threaded portion 513 of the head. The large flow conductor 49 is threaded in the upper threaded portion 514 of the head and the conduit from the manifold is threaded in the outer threaded portion 515 of the passage 516 which opens to the annular passage between the inner and outer concentric flow conductors. The control fluid is thus transmitted to the valve 45 through the annular passage 48 of the concentric flow conductors which extends above the working platform.

Referring now to FIGURE 16, if the well installation 30a has its stack of blowout preventers 33 above the surface of the water, the platform being permanently secured to the earth below the water, the outer flow conductor 46 provided with an annular recess [474] *500* may be connected to the valve 45 by a plurality of sections 46a and to the head 510 by one or more sections 46b. Similarly, the inner flow conductor 47 may be comprised by a plurality of sections connected by suitable couplings. The inner and outer flow conductors, the ball valve 45, and the string of tubing 44 will of course be held by the blowout preventers 33 and the control fluid from the manifold will be transmitted to and from the valve through the concentric annular passage 48 between the two flow conductors.

It will be apparent that in each of the installations described, the valve is positioned at a location near the bottom of the body of water so that if any damage occurs to the installation above the well, the valve will automatically close, or "fail safe," to prevent flow of well fluids through the string of tubing.

It will now be apparent that a new and improved apparatus has been illustrated and described for performing various operations in a well which utilize the blowout preventers of the equipment which was used during the drilling of the well to support a string of tubing and a valve which control the flow of fluids through the string of tubing.

It will further be seen that the apparatus includes flow coiductor means which comprises inner and outer concentric flow conductors which provide an annular passage for the flow of control fluid to and from the valve and that the outer flow conductor above the valve is held by a blowout preventer.

It will further be seen that he annular passage provided by the concentric flow conductors may extend to the surface if desired, as in the case of the installations illustrated in FIGURES 15 and 16, or a small conduit 50, as in the case of the well installations illustrated in FIGURES 1 and 14, may be provided to communicate with the upper end of the annular passage.

It will further be seen that the flow conductors 49 and 50 may be detachably secured by means of a connector head 51 connected to the [cencentric] *concentric* flow conductors above the blowout preventers so that the upper portions of the conductors which permit flow of fluids through the string of tubing and permit movement of well tools therethrough and of the control fluid may be easily disconnected therefrom and reconnected thereto.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A flow conductor assembly for use in a well installation providing vertical passage opening into the well and having holding means for holding a flow conductor extending through the passage into the well and for closing the passage around such flow conductor, said flow conductor assembly including: a lower flow conductor; a fluid pressure operable valve connected to the lower flow conductor for controlling fluid flow therethrough; upper flow conductor means connected to said valve and having an upper portion detachably and removably connected with the lower portion thereof, said conductor means extending upwardly from said valve for conducting fluid flowing through said valve and said lower flow conductor to the well surface and for conducting control fluid to said valve for operating said valve, said lower portion of said upper flow conductor means having a portion thereof disposed to be engaged by the holding means whereby when said flow conductor means is engaged by said holding means, said valve and lower flow conductor assembly is held in position in the well installation, *and* the valve is positioned below the holding means.

2. The flow conductor assembly of claim 1 wherein said flow conductor means comprises a pair of telescoped spaced inner and outer flow conductors, said telescoped flow conductors providing an annular passage through which control fluid under pressure is conducted to said valve to operate said valve, said valve when open permitting fluid flow between said lower flow conductor and said inner flow conductor.

3. The flow conductor assembly of claim 2, wherein said outer flow conductor has means providing spaced facing shoulders engageable by said holding means to hold said well flow conductor assembly against movement in the well installation.

4. A flow conductor assembly for use in a well installation employed during the drilling of a well, the well installation including a blowout preventer, a latch head above the blowout preventer and a riser pipe connectable to the latch head to provide a passage through the riser pipe, the blowout preventer and the latch head extending to the upper end of the casing of the well, said flow conductor assembly including: a valve, a string of tubing connected to said valve and extending downwardly therefrom; a pair of telescoped flow conductors connected to the upper end of said valve, the inner of said telescoped flow, conductors conducting fluid flowing through said valve and said lower flow conductor, said telescoped flow conductors providing a control fluid passage therebetween through which control fluid is conducted to said valve to operate said valve, said outer flow conductor having means engageable by the blowout preventer of the well installation for holding the flow conductor assembly in the well; said flow conductors above said blow-out preventer being removable from the well bore being disconnectible from the flow conductors supported by said blowout preventer so as to be removable from the well, leaving the telescoped conductor therebelow and the valve supported in the well by the blowout preventer.

5. The flow conductor assembly of claim 4, and a connector head secured to the upper ends of said telescoped flow conductors, said connector head having a first passage in communication with said inner flow conductor, said connector head having means including a housing spaced from said first passage and providing a second passage in communication with said control *fluid* passage; a first flow conductor having a latch mandrel receivable in said first passage of said connector head establishing communication between the lower end of said first flow conductor and the upper end of said inner flow conductor[s]; and a second flow conductor having a latch mandrel assembly receivable in said housing establishing communication between the lower end of said second flow conductor and the upper end of said control *fluid* passage.

6. The flow conductor assembly of claim [7] *5*, wherein said connector head has first latch means engageable with said latch mandrel upon downward movement of said latch mandrel into said first passage of said connector head for preventing upward nonrotational movement of said latch mandrel from said first passage and second latch means engageable with said latch mandrel assembly upon downward movement of said latch mandrel assembly into said second passage for preventing upward nonrotational movement of said latch mandrel assembly from said second passage.

7. The flow conductor assembly of claim 6, wherein said latch mandrel has an external annular recess intermediate its ends and a longitudinal external recess opening upwardly into the recess, said latch mandrel having means below said longitudinal recess engageable by said first latch means; and a guide mounted on said latch mandrel, said guide including passage means providing a first longitudinal passage through which said latch mandrel extends and a second longitudinal passage spaced from said first passage, a bottom horizontal plate, a top plate disposed about said passage means, said top plate extending angularly relative to said passage means and having a top surface coplanar with the top ends of said passages and sloping downwardly from said first passage of said passage means to said second passage of said passage means, said plates being secured to said passage means, and stop means extending inwardly into said [second] *first* passage and movable in said recesses of said latch mandrel whereby when said guide is in an upper position on said latch mandrel and said stop means is in said longitudinal recess, said stop means prevents rotation of said latch mandrel relative to said guide, said stop means limiting longitudinal movement of said latch mandrel relative to said guide, an upper portion of said [elongate] housing being receivable in said second longitudinal passage *when said second longitudinal passage* is aligned therewith, said bottom plate engaging said [elongate] housing to limit downward movement of said guide and said latch mandrel and prevent engagement of said means of said latch mandrel with said first latch means when said second longitudinal passage is not vertically aligned with said [elongate] housing.

8. The flow conductor assembly of claim 5, wherein said [housing] *connector head* has valve means for closing said second passage of said connector head, said valve means being biased toward closed position, said latch mandrel assembly having means engageable with said valve means for holding said valve means in open position when said latch mandrel assembly is in said [housing] *connector head.*

9. The flow control assembly of claim 8, wherein said valve means includes a check valve preventing flow through said second passage to said control *fluid* passage when said valve means is in closed position.

10. The flow conductor assembly of claim 8, wherein said latch mandrel assembly includes second valve means for controlling fluid flow through said second flow conductor, said second valve means being engageable with said first mentioned valve means and being moved to open position upon downward movement of said latch mandrel assembly into said second passage.

11. The flow control assembly of claim 10, wherein said valve means includes a check valve preventing flow through said second passage to said control *fluid* passage when said valve means is in closed position.

12. A flow conductor assembly for use in a well installation employed during the drilling of a well, the well installation including a blowout preventer, a latch head above the blow-out preventer and a riser pipe connectable to the latch head to provide a passage through the riser pipe, the blow-out preventer and the latch head extending to the upper end of the casing of the well, said flow conductor assembly including: a valve; a string of tubing connected to said valve and extending downwardly therefrom; a pair of telescoped flow conductors connected to the upper end of said valve, the inner of said telescoped flow conductors conducting fluid flowing through said valve and said lower [flow conductor] *tubing,* said telescoped flow conductors providing a control *fluid* passage therebetween through which control fluid is conducted to said valve to operate said valve, said outer flow conductor having means engageable by the blow-out preventer of the well installation for holding the flow conductor assembly in the well; and a connector head secured to the upper ends of said telescoped flow conductors, said connector head having a first passage in communication with said inner flow conductor and a second upwardly opening passage in communication with said control *fluid* passage; a first flow conductor having means disposed in said first passage of said connector head establishing communication between the lower end of said first flow conductor and the upper end of said inner flow conductor; and a second flow conductor having means disposed in said second passage establishing communication between the lower end of said second flow conductor and the upper end of said control *fluid* passage.

13. The flow conductor assembly of claim 12, and latch means on said connector head and said means of said first and second flow conductors *disposed in said passages of said connector head* engageable upon downward movement of said means into said passages of said connector head for preventing upward nonrotational movement of said means relative to said connector head.

14. A connector head including: tubular means providing a passage through said connector head, said tubular means having spaced means for securing the upper ends of a pair of telescoped spaced conductors to said tubular means whereby the inner of such flow conductors opens upwardly to said passage; first latch means carried by said tubular means for releasably engaging a latch mandrel insertable downwardly into the upper end of said passage; a housing connected to said tubular means providing a second passage communicating with said tubular means between said spaced means; and second latch means carried by said housing for releasably engaging a latch mandrel insertable downwardly into the upper end of said housing.

15. A connector head including: tubular means providing a longitudinal passage through the connector head, said tubular means having spaced means at the lower end portion thereof for securing the upper ends of a pair of telescoped spaced conductors to said tubular means whereby the inner one of said telescoped conductors opens upwardly to said passage, seal means in said passage above said spaced means for sealing with the lower end of a latch mandrel insertable downwardly in said longitudinal passage; first latch means carried by said tubular means above said seal means for releasably engaging external threads means of a latch mandrel when it is inserted downwardly into said passage, said first latch means comprising a latch having a plurality of circumferentially upwardly extending resilient fingers provided at their upper end portions with internal thread teeth which extend inwardly into said passage for engaging thread means of a latch mandrel, upper ends of said latch means being [moveable] *movable* resiliently outwardly to permit downward movement of thread means of a latch mandrel relative thereto and into engagement therewith, said thread teeth of said first latch means preventing upward movement of the latch mandrel relative thereto when in engagement with the thread means of the latch mandrel and permitting upward rotational movement of the latch mandrel relative thereto to permit removal of the latch mandrel from the passage.

16. The connector head of claim 15, wherein said tubular means and said latch fingers have cooperable cam means engageable upon upward movement of the latch fingers in said tubular means for camming upper end portions of the latch fingers inwardly toward engagement with thread means of a latch mandrel disposed in said passage of said connector head.

17. The connector head of claim 15, wherein said connector head has a tubular housing providing a second passage opening downwardly in said tubular means between opening downwardly in said tubular means becarried by said housing for releasably engaging a latch mandrel insertable downwardly into the upper end of said housing.

18. The connector head of claim 17, wherein [each of] said [first and] second latch means comprises a latch having a plurality of circumferentially spaced upwardly extending resilient fingers provided at the upper end portions with [the] thread teeth for engaging thread means of a latch mandrel, upper ends of said latch fingers being [moveable] *movable* resiliently outwardly to permit downward movement of thread means of a latch mandrel therebetween and into engagement therewith, said thread teeth of said latch means preventing upward movement of the latch mandrel relative thereto when in engagement with tending resilient fingers provided at the upper end portions the thread means of the latch mandrel and permitting upward rotational movement of the latch mandrel relative to the latch means to permit removal of a latch mandrel from the *housing of the* connector head.

19. The connector head of claim 18, wherein said housing and said tubing means have means engageable with the latch fingers of the latch disposed therein for camming upper ends of the latch fingers inwardly upon upward movement of the latches therein.

20. A guide mountable on a latch mandrel having an external annular recess and a longitudinal recess opening upwardly into the annular recess, said guide including: means providing a central longitudinal passage and a second longitudinal passage spaced from said central passage, said central passage being adapted to receive the latch mandrel; a bottom horizontal plate and a top plate disposed about said means, said top plate extending angularly relative to said means and having a top surface coplanar with the top ends of said passages and sloping downwardly to said second passage, said plates being secured to said means; and stop means extending inwardly into said central passage and receivable in the recesses of the latch mandrel whereby when said guide is in [an upper] *a lower* position on said latch mandrel and said stop means is in *said* longitudinal recess, said stop means prevents rotation of said latch mandrel relative to said guide, said stop means limiting longitudinal movement of said latch mandrel relative to said guide.

21. A guide mountable on a latch mandrel having an external annular recess and a longitudinal, outwardly opening recess which also opens upwardly into the annular recess, said guide including: means providing a central longitudinal passage and a second longitudinal passage spaced from said central passage, said central passage being adapted to receive a latch mandrel, said guide having a bottom horizontal surface and a top surface extending angularly relative to said passages and being coplanar with the top ends of said passages, said top surface sloping downwardly to said second passage; and stop means extending movably inwardly into said central passage and receivable in the recesses of the latch mandrel, whereby when said guide in [an upper] *a lower* position on said latch mandrel and said stop means is in *said* longitudinal recess, and stop means prevents rotation of said latch mandrel relative to said guide, said stop means limiting longitudinal movement of said latch mandrel relative to said gate.

22. A guide mountable on a latch mandrel having an external annular recess and a longitudinal outwardly opening recess opening upwardly into the annular recess, said guide including: a first *central* tubular member providing a central longitudinal passage and a second tubular member providing a second longitudinal passage, said second tubular member being spaced from said central tubular member, said central tubular member being adapted to receive a latch mandrel therethrough; a bottom horizontal plate; a top plate, said plates having aligned vertical [recesses] *apertures,* said tubular member extending into said apertures, said top plate extending angularly relative to said tubular members and having a top surface coplanar with the top surfaces of said tubular members and sloping downwardly to said second tubular member, said plates being secured to said tubular members; and stop means mounted on said central tubular member and receivable in said recesses of the latch member whereby when said guide is in [an upper] *a lower* position on a latch mandrel which extends through said central tubular member and said stop means is in said longitudinal recess, said stop means prevents rotation of said latch mandrel relative to said guide, said stop means limiting longitudinal movement of said latch mandrel relative to said guide.

23. A method of operating a sub-sea well having a bore penetrating earth formations below a body of water and drilled by equipment which includes blow-out preventers positioned above the bore and below the surface of the water for closing the upper end of the well bore about a flow conductor extending into the well bore and for holding such flow conductor against vertical movement and a riser pipe extending from above the blow-out preventers to a level above the surface of the water, said method including: removing the drilling means by means of which the well bore was drilled and which extended through the blow-out preventers and leaving the blow-out preventers in place; introducing into the well bore through the riser pipe and the blow-out preventers a flow conductor assembly having a flow conductor, a pressure responsive valve means for controlling flow of fluid through the flow conductor and passage means for transmitting control fluid pressure to the valve means; positioning the flow conductor assembly in the well in position wherein the flow conductor of the flow conductor assembly extends into the well bore and to the surface of the water through the blow-out prevents and the riser pipe and wherein the passage means extends from above the surface of the water through the riser pipe to the valve means; operating said blow-out preventers to cause them to close the well bore about the flow conductor assembly and hold the flow conductor assembly against vertical movement; and controlling at the surface the fluid pressure in said passage means selectively to open and close said valve means.

24. The method of claim 23, wherein the flow conductor assembly has an upper portion detachably connected to a lower portion at a location above the blow-out preventers and wherein said valve means is in said lower portion, and the method includes the additional steps of closing the valve means, and then removing the upper portion of the flow conductor assembly and closing said passage means at a location within the lower portion of said flow conductor assembly to prevent flow of water into said passage means when the upper portion of the flow conductor assembly is removed.

25. The method of claim 24, and the additional steps of removing the riser pipe and leaving the lower portion of the flow conductor assembly held in the well bore by the blow-out preventers and then subsequently replacing the riser piper, moving the upper portion of the flow conductor assembly through the riser pipe to the lower portion thereof and connecting the upper and lower portions to each other, and then controlling at the surface the fluid pressure in the passage means to open and close the valve means.

26. A flow conductor assembly for use in a well installation providing a vertical passage opening into the well and having holding means for holding a flow conductor extending through the passage into the well and for closing the passage around such flow conductor, said flow conductor assembly including: a lower flow conductor; a fluid pressure operable valve connected to the lower flow conductor for controlling fluid flow therethrough; upper flow conductor means having its lower portion connected to said valve and extending upwardly from said valve for conducting fluid flowing through said lower conductor and said valve and for conducting control fluid to said valve for operating said valve, said flow conductor means having connector means therein for receiving a flow [education] *eduction* tubing and a flow control fluid conduit detachably connected therewith, said flow conductor means being engageable by the holding means to support the assembly in the well installation with the valve positioned below the holding means, and said eduction tubing and control fluid conduit means being insertable and removable from flow communicating connection with said connector means of said flow conductor means.

*27. A flow conductor assembly for use in a well installation providing a vertical passage opening into the well bore producing formation and having holding means for holding a flow conductor extending into the well bore and for closing the passage around such flow conductor, said flow conductor assembly including: a lower flow conductor; a fluid pressure operable valve comprising a plurality of spaced valve closure means movable between open and closed positions which coact to provide a closure by means of one of the valve closure means should the other of said valve closure means fail to assure a closure; said valve means being connected to a lower flow conductor for controlling fluid flow upwardly therethrough; connecting means on the upper end of said valve; upper flow conductor means detachably and removably connected with the connecting means on said valve, said upper conductor means extending upwardly from said valve to the well surface providing means for conducting well fluids from the valve to the surface and for conducting control fluid pressure to said plurality of valve closure means for operating said valve closure means to hold the same in one of said open and closed positions; said flow conductor assembly having a portion disposed to be connected by the holding means whereby, when the flow conductor means is engaged by said holding means, said valve and lower flow conductor are held in operative position in the well installation by said holding means.*

*28. A flow conductor assembly for use in a well installation having a vertical bore opening into the producing formation and having holding means for holding a flow conductor extending through the bore into the well and for closing the bore externally around said flow conductor, said flow conductor assembly including: a lower flow conductor communicating with the producing formation; a fluid pressure operable valve connected to the upper end of said lower flow conductor and providing a pair of longitudinally spaced valve closure members coacting to close off flow from the formation through said lower flow conductor in event one of said valve closure members should fail to properly fully close off such flow; a fluid eduction tubing and a control fluid conduit extending from the surface to said valve; connector means on the upper end of said valve for receiving said flow eduction tubing and a flow control fluid conduit for detachably connecting said eduction tubing and control fluid conduit with said valve and providing separate flow passages to said lower portion of said conductor assembly and to said valve, respectively; means for supporting said flow conductor assembly in the well bore with the valve disposed to control flow from the formation through the lower flow conductor; said eduction tubing and control fluid conduit means being detachable and removable from said flow communicating connection with said connector means of said valve.*

*29. A flow conductor assembly of the character set forth in claim 28, wherein: said connector means is provided at its upper end with guide means for guiding said flow eduction tubing into said connector means in flow communication with the lower flow conductor through the valve, and means for guiding said control fluid conduit into said connector means to communicate with said valve closure members for operating the same.*

*30. A device of the character set forth in claim 28 wherein said valve includes: piston means in said valve connected with said valve closure members exposed to control fluid pressure from said control fluid conduit to be actuated thereby to move said valve closure members to open position; and resilient means biasing said valve closure members toward closed position against the force of the control fluid pressure acting on said piston means, and when said control fluid pressure is relieved moving said closure members to said closed position.*

*31. A flow conductor assembly of the character set forth in claim 30 wherein: said connector means at the upper end of the valve comprises: a connector head having a first passage communicating through the valve with the lower flow conductor below the valve and with said fluid eduction tubing above the valve and a second upwardly opening passage in communication with said control fluid conduit and with the valve closure members.*

*32. A flow conductor assembly for use in a well installation employed during the drilling of a well having casing therein, wherein the well installation includes a blow-out preventer and latch head assembly connected with said well casing, a riser connected to the upper end of said blow-out preventer and latch head assembly to provide a passage from the blow-out preventer and latch head assembly through the riser to the well surface, and wherein said flow conductor assembly includes: a string of pipe extending downwardly in said well and having at its upper end a valve comprising a pair of spaced closure members for controlling flow from said well formation through said pipe and said valve; a pair of flow conductors connected to the upper end of said valve, one of said flow conductors conducting fluid flowing from the well formation through the pipe and said valve to the surface, the other of said flow conductors providing a fluid passage through which control fluid is conducted to said valve to operate said valve closure members, said flow conductor assembly having means engageable by the blow-out preventer of the well installation for holding the flow conductor assembly in the well and providing a support for the pipe in the well and the valve at the upper end thereof, and for providing a seal between the casing and said pipe when closed against said flow conductor assembly; said pair of flow conductors above said valve being disconnectable from said valve and removable from the well bore above the flow conductor assembly supported by the blow-out preventer, leaving the pipe and the valve supported in the well by the blow-out preventer.*

*33. A flow conductor assembly of the character set forth in claim 32 wherein: a connector head is provided at the upper end of the valve; said connector head having a first passage communicating through the valve with the pipe below the valve and with said one of said flow conductors above the valve and a second upwardly opening passage in communication with the other of said flow conductors above the valve and with the valve closure members.*

*34. A flow conductor of the character set forth in claim 33 wherein: said connector head is provided at its upper end with guide means for guiding said one of said upper flow conductors into said connector head in flow communication with the lower flow conductor through the valve, and means for guiding said other of said upper flow*

*conductors into said connector head to communicate with said valve closure members for operating the same.*

*35. A device of the character set forth in claim 33 wherein said one upper flow conductor and said other upper fluid flow conductor and said connector head are provided with coengageable means for releasably securing said conductors in said passages in said connector head, whereby said pair of upper flow conductors may be removed from connection with said connector head when desired, leaving the pipe and valve supported by the blow-out preventers in the well in sealed relation closing off flow from the well.*

*36. A device of the character set forth in claim 35 wherein said connector head is provided with guide means for guiding said one of said upper fluid flow conductors into communication with said first passage in said connector head and for guiding said other of said upper fluid conductors into communication with the second upwardly opening passage in said connector head, for re-establishing communication with the pipe below the valve and with the valve closure members, respectively.*

*37. A device of the character set forth in claim 34 wherein: each said valve closure member is releasably connected with an operator piston and is releasable from connection with said operator piston under a predetermined force applied to said closure member, whereby fluid pressure from said one of said upper flow conductors may be applied to said valve closure members in sequence to move said closure members to a position permitting flow therethrough to the pipe below the valve.*

*38. A device of the character set forth in claim 32 wherein said valve includes: piston means in said valve connected with said valve closure members exposed to control fluid pressure from said control fluid conductor to be actuated thereby to move said valve closure members to open position; and resilient means biasing said valve closure members toward closed position against the force of the control fluid pressure acting on said piston means, and when said control fluid pressure is relieved moving said closure members to said closed position.*

*39. A device of the character set forth in claim 38 wherein the valve closure members are longitudinally spaced and said piston means for actuating the spaced valve closure members comprises a pair of separate operator pistons, each exposed to the control fluid pressure conducted into the valve from said other of said upper flow conductors and operable by the pressure of such control fluid for moving the valve closure members to open position.*

*40. A device of the character set forth in claim 39 wherein separate resilient means is provided in the valve coacting with each of the pair of longitudinally spaced valve closure members separately and independently moving said valve closure members to closed position when the control fluid pressure is relieved from the operator piston means.*

*41. A device of the character set forth in claim 38 wherein: means is provided in said valve for conducting fluid pressure of the fluids flowing through the valve to said piston means to act on said piston means in co-action with said resilient means to move said valve closure means to closed position.*

*42. A device of the character set forth in claim 41 wherein said means for conducting fluid pressure to said piston means also when said valve closure members are in closed position serves to conduct the pressure of the fluids in said one of said upper flow conductors above the valve to said piston means to aid said resilient means in biasing said closure members closed.*

*43. A method of operating a sub-sea well having a bore penetrating earth formations below a body of water and drilled by equipment which includes blow-out preventers positioned above the bore and below the surface of the water for closing the upper end of the well bore about a flow conductor extending into the well bore for holding such flow conductor against vertical movement and a riser pipe extending from above the blow-out preventers to a level above the surface of the water, said method including: introducing into said well bore through the riser pipe and the blow-out preventer a flow conductor assembly having a lower flow conductor and a pressure responsive valve means for controlling flow of fluid through the flow conductor and passage means for conducting control fluid pressure to said valve means, an upper flow conductor extending from the flow conductor assembly to a level above the surface of the water and communicating with the valve means and the flow conductor in the well bore therebelow for conducting fluids to and from said lower flow conductor and the well bore below the blow-out preventers, and a control fluid conduit extending from the flow conductor assembly to a level above the surface of the water and communicating with the control fluid conducting passage means of said flow conductor assembly for conducting control fluid pressure to said valve means for operating the same; operating the blow-out preventers to cause them to close the well bore in sealing relationship about the flow conductor assembly below the upper flow conductor and control fluid conduit to hold the flow conductor assembly against vertical displacement; and controlling the control fluid pressure in said passage means selectively to open and close said valve means.*

*44. The method of claim 43 and the further steps of closing the valve means; and detaching said upper flow conductor and said control fluid conduit from said flow conductor assembly and leaving said flow conductor assembly with its lower flow conductor supported by said blow-out preventers.*

References Cited

The following references, cited by the Examiner, are of record in the patented file of this patent or the original patent.

UNITED STATES PATENTS

| | | | |
|---|---|---|---|
| 2,179,033 | 11/1939 | Cashion | 166—224 X |
| 2,785,755 | 3/1957 | En Dean | 166—72 |
| 2,894,715 | 9/1959 | Bostock | 166—72 X |
| 3,087,547 | 4/1963 | Raulins | 166—89 |
| 3,094,170 | 6/1963 | Bourne | 166—224 |
| 3,137,348 | 6/1964 | Ahlstone | 166—.6 |
| 3,170,518 | 2/1965 | Brown | 166—67 X |
| 3,189,098 | 6/1965 | Haeber | 166—.6 |
| 3,280,908 | 10/1966 | Todd | 166—.6 |
| 3,310,107 | 3/1967 | Yancey | 166—.6 |

FOREIGN PATENTS

| | | |
|---|---|---|
| 540,029 | 8/1955 | Belgium. |

RICHARD E. MOORE, Primary Examiner

R. E. FAVREAU, Assistant Examiner

U.S. Cl. X.R.

166—224

PO-1050
(5/69)

UNITED STATES PATENT OFFICE
CERTIFICATE OF CORRECTION

Patent No. RE 27464 Dated August 22, 1972

Inventor(s) Donald F. Taylor

It is certified that error appears in the above-identified patent and that said Letters Patent are hereby corrected as shown below:

Column 12, line 33, for "221" (second occurrence) read --221a--

Column 15, line 43, for "cammend" read --cammed--

Column 16, line 19, after "tubular" insert --member--

Column 20, line 29, for "vavle" read --valve--

Column 21, line 57, for "coiductor" read --conductor-- line 62, for "he" read --the--

Claim 4, line 56, after "flow" cancel ","

Claim 15, line 64, cancel "s" in "threads"

Claim 17, line 15, for "opening downwardly in said tubular means be-" read --said spaced means, and a second latch means--

Claim 18, line 30, cancel this line "tending resilient fingers provided at the upper end portions"

Claim 21, line 72, after "guide" insert --is--

Signed and sealed this 27th day of March 1973.

(SEAL)
Attest:

EDWARD M.FLETCHER,JR.
Attesting Officer

ROBERT GOTTSCHALK
Commissioner of Patents